(12) United States Patent
Powers et al.

(10) Patent No.: US 6,362,817 B1
(45) Date of Patent: Mar. 26, 2002

(54) SYSTEM FOR CREATING AND VIEWING 3D ENVIRONMENTS USING SYMBOLIC DESCRIPTORS

(75) Inventors: Michael Powers, San Francisco; Philip Stephens, Pleasant Hill, both of CA (US)

(73) Assignee: IN3D Corporation, San Francisco, CA (US)

( * ) Notice: Subject to any disclaimer, the term of this patent is extended or adjusted under 35 U.S.C. 154(b) by 0 days.

(21) Appl. No.: 09/080,890

(22) Filed: May 18, 1998

(51) Int. Cl.$^7$ .............................................. G06T 15/00
(52) U.S. Cl. ...................................... 345/419; 345/428
(58) Field of Search .............................. 345/433, 428, 345/419, 418, 429, 474, 582; 340/286.14

(56) References Cited

U.S. PATENT DOCUMENTS 4,688,181 A * 8/1987 Cottrell et al. ............... 345/421
5,504,853 A * 4/1996 Schurr et al. ................ 345/160
5,748,867 A * 5/1998 Cosman et al. .............. 345/430

OTHER PUBLICATIONS

Microsoft Corporation, "Chromeffects" White Paper, located at http://www.microsoft.com/Windows/chromeffects/WhitePaper.asp?custarea=bus&site=family&openmenu=&highlighteditem=.

* cited by examiner

*Primary Examiner*—Cliff N. Vo
*Assistant Examiner*—Philip H. Stevenson
(74) *Attorney, Agent, or Firm*—Charles J. Kulas; Townsend and Townsend and Crew, LLP

(57) ABSTRACT

A computer-based system for designing and using three-dimensional environments over a bandwidth limited network such as the Internet. The system allows an environment to be specified as a series of two-dimensional grids of text characters. Each character occupies a single grid position and represents an object in the environment. Objects can be given characteristics such as texture maps, and associated images and sounds that are triggered by events such as a user approaching the object. An object or image can be a hyperlink so that, when clicked or moved upon, the user is transported to a new location. A basic set of objects and media (images and sounds) is provided so that a designer of an environment does not have to perform low-level three-dimensional modeling. Objects can behave differently when placed near one another. For example, walls fuse together to provide a longer wall. Ramps weld together to provide a single, longer, ramp having a slope that is shallower than the two or more ramps welded together. The environments are customizable by referring to block objects, texture maps, bitmap images, sound files, etc., that can be located anywhere on the Internet, including the user's computer. The system adapts to display differing levels of detail dependent on the performance ability of the user's computer platform.

10 Claims, 32 Drawing Sheets

Microfiche Appendix Included
(4 Microfiche, 377 Pages)

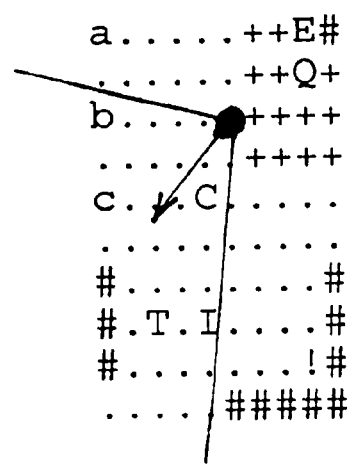
FIG. 3D
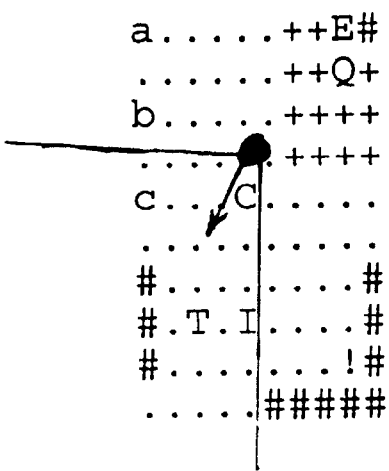
FIG. 3E
```
++L++
+++++
+++++
+++++
```
FIG. 3F

SYSTEM FOR CREATING AND VIEWING 3D ENVIRONMENTS USING SYMBOLIC DESCRIPTORS

COPYRIGHT NOTICE

A portion of the disclosure recited in the specification contains material which is subject to copyright protection. Specifically, a Microfiche Appendix in accordance with 37 CFR Section 1.96 is included which lists source code instructions for a process by which the present invention is practiced in a computer system. The Appendix includes 4 fiches having 377 frames, or pages, of source code. The copyright owner has no objection to the facsimile reproduction of the specification as filed in the Patent and Trademark Office. Otherwise all copyright rights are reserved.

BACKGROUND OF THE INVENTION

This invention relates generally to computer graphics processing and more specifically to the creation and display of a three-dimensional environment generated by a computer system using a symbolic map description of the environment downloaded from a network.

The Internet has established itself as a world-wide information resource. It is also growing rapidly as a resource for commerce and entertainment. Essentially, this has been brought about by the development of the World Wide Web ("WWW" or simply "Web") which provides presentations of text, images and sound on Web "pages." Not only have Web pages received wide acceptance because of their effectiveness in presenting information, but the simplicity and ease of creating, or "authoring," Web pages has ensured their widespread use throughout the Internet.

One reason that authoring of Web pages is so easy is that the language used to create a Web page uses simple plain-text words and syntax. Thus, Web page authoring is easy for non-technical designers to understand. Unlike prior languages which allowed powerful control over computer information processing and presentation, authoring a Web page does not require computer programming knowledge. Since the language format is represented as plain-text it can easily be edited in a standard word processor as opposed to a dedicated application or user interface such as a computer-aided design or publishing system. Also, the language is compact and results in very short files that can be quickly downloaded from a "server," or provider computer, to a user's "client" computer.

Web pages are written in Hyper-Text Markup Language (HTML). HTML, commonly referred to as "hyper-text," allows authors to design web pages by using "tags" to specify the page layout and style. For example, the font size, indentation, number of columns, etc. can be specified for text. Also, graphical effects such as the background pattern and color, placement of images, animations, etc., can be specified. An important feature of hyper-text is that, hyper-links can be defined. A hyper-link allows a Web page to "link" to another page. When a viewer, or user, of a computer system points and clicks on an item in a first Web page a linked, or referenced, second page is displayed in place of the first page. This powerful referencing mechanism allows information to be associated with other information among Web pages located anywhere throughout the entire world.

Another standard that is part of the design of the Web provides for identifying and accessing each page, or other object, by using a unique address called a Uniform Resource Locator (URL). The format of the URL allows any object on any server that is part of the Internet to be accessed by other computers. Not only can Web pages be accessed in this manner, but pictures, animations, movie clips, sounds, etc., can be referenced and displayed within a Web page or by other means through various computer programs executing on a user's computer.

Each of the above features of the World Wide Web, that of HTML standardization, ease of Web page authoring, hyper-link referencing, quick downloading and universal addressing scheme have served to make the Web useful and popular. "Browsing" of Web pages has been made simple by the popularity of browser programs that display Web pages in a point-and-click interface that is mostly provided by the Web page layout, itself.

However, a shortcoming of today's Web page-based information is that it is strictly 2-dimensional. A Web page is analogous to a printed page in that text and images are laid out adjacent to each other. Even though computers are capable of detailed 3-dimensional simulation, this type of presentation is virtually nonexistent in Internet applications because of limitations in the speed with which data can be transmitted from a server computer to a client computer. On today's Web pages only limited ways of performing animations are possible, such as animated ".gifs," server "push," client "pull" and other animation techniques that allow small windows of choppy animation. Other techniques such as MPEG compression and playback, or streaming formats attempt to provide television-like delivery of information. However, all of these approaches result in very small windows of animation that tend to have low frame rates. Further, these delivery methods are very non-interactive. That is, these methods provide little more than a way to insert small snippets of an animated sequence into a Web page. Typically, the animation will play continuously, in a "looped" fashion, or until the user decides to stop the playback.

While a Web page, and the animation methods discussed so far, are adequate for presenting many types of information they are not as effective for certain applications sometimes referred to as a "full-immersion," or an interactive 3-dimensional simulation. Such technology allows a user to move about at will in a 3-dimensional world, or environment, viewed through the display screen of the computer. A user is able to move around in, look at and interact with objects in the 3-dimensional environment much as they would in the actual physical world. Not only is such a technique able to convey certain types of information, for example, architectural, landscaping, urban planning, etc., but it is more entertaining, and can be more intuitive, than the traditional printed page approach to presenting information on the Web.

A prior approach to providing a 3-dimensional simulated environment on the Web, used a language called virtual reality markup language (VRML). A specification for VRML can be found in "A BEGINNER'S GUIDE TO VRML" at http://home.netscape.com/eng/live3d/howto/vrml_primer_toc.html Although the goal of VRML is to provide a 3-dimensional environment easily created and used by authors and users of the Web, it has failed to gain acceptance because of some major shortcomings.

One shortcoming of VRML is that defining 3-dimensional structures, and placing those structures in a 3-dimensional environment is complex. VRML requires an author to specify objects in terms of shapes such as a cube, sphere, cone and cylinder. Placement of objects is by x, y, z distances. Thus, not only is a high degree of geometric knowledge and thought required in order create even the simplest 3-dimensional world, but piecing together shapes in order to make an object requires experience with computer aided modeling techniques. Because of the format that VRML uses, it is not possible to look at a VRML page description and immediately understand the layout of the 3-dimensional world.

Another shortcoming of the VRML approach is that complex custom viewers are necessary to interpret the VRML page in order to generate the screen displays simulating the 3-dimensional world. Because of the complexity of the VRML language, VRML viewers tend to be large and require processing and memory resources of the computer system on which they execute. Although at the time of initial excitement of VRML many such viewers were promised, few actually materialized. As the World-Wide Web stands today there is a near-complete lack of 3-dimensional simulation in Web pages.

Thus, it is desirable to provide a 3-dimensional simulation system for the Internet (or any bandwidth limited network) and specifically the World-Wide Web. Such a system should provide easy authoring of 3-dimensional worlds. The system should also provide for fast and efficient rendering of scenes in the 3-dimensional world so that the 3-dimensional viewers can be easily integrated into popular browsers. The 3-dimensional world should be able to be described simply so that it will be understood by the large number of present Web designers. The 3-dimensional world description should not require complex editing applications and the resulting description files should be compact so that the time to download a 3-dimensional world definition from an Internet server into a user's computer system will be short. The generation of views, or frames, should operate quickly and efficiently on a user's computer system, adapting to the processing and memory resources available to produce a better 3D experience. Finally, the system should achieve the goals of enhancing the information, entertainment and commerce uses of the Internet.

SUMMARY OF THE INVENTION

The present invention provides a system for generating a three-dimensional environment by using a symbolic map to define the type and location of objects in the environment. The symbolic map is a plain-text file that uses a single text character to represent a square area, or an object on a square area, in the environment. For example, the letter "t" is used to represent a tree; the symbol "." is used to represent a blank space; the symbol "#" is used to represent a wall (if facing a side of it), a basic block (for making walls or structures) or the floor or ground (if walked upon).

The placement of the single-character text symbols in a rectangular grid defines a level of the environment. Levels can be stacked. A viewer program is used to generate an interactive three-dimensional world based on the symbolic map. The use of a text based symbolic map provides a simple and accessible format for three-dimensional modeling. The invention uses a versatile file organization and file formats that allow polygon objects to be defined, assigned to character symbols and given characteristics. A basic set of objects is predefined so that a designer can immediately begin creating visually rich and interesting environments without having to painstakingly define objects.

Some characteristics that can be assigned to objects include specifying texture maps for parts of an object (such as for the leaves on a tree) to give a custom look to the object. The texture maps can be from a predefined library or can be custom texture files that the designer (or another party) provides. Image and audio information can be associated with an object. This allows a pop-up sign or menu to come into display when a user moving about in the environment comes within close range of an object. A sound can also be played so that when an object is approached it emits a sound. Objects can be given a hyperlink property so that the user is "teleported" from a first spot to a second spot. The second spot can be an entirely separate symbolic map file located anywhere on the Internet. This is true for each component of the system, including the block files and media files which can be loaded from anywhere on the Internet, as needed.

Another way to join spots, rather than by teleporting, is to specify a placement (e.g., North, South, East, West, or by coordinate values, etc.) for additional Spot files. When the user gets within a predetermined radius of the edge of the current Spot, the additional Spot at the user's area is loaded so that the user can move seamlessly from the first Spot to an additional Spot as if the two Spots were one.

Standard features of HTML pages can be used within the environment. An example is an imagemap, which can exist at a block location or be associated as a pop-up image, or sprite. The imagemap can be clickable to hyperlink the user to another spot, or to a standard web page. The invention provides for block objects placed adjacent to one another to fuse into a different object. An example is when two ramp objects are placed together and result in a single ramp of shallower slope when viewed within the environment.

Items such as light sources can be placed and realistically illuminate adjacent objects within the environment. Provision can be made for objects to be given motion instructions for moving about the environment. Traditional Internet media formats (e.g., bitmap images, movies) are supported within the environment. A multi-faceted sprite image is supported which displays a different image depending on the user's viewing angle to the object. This can give the impression that the user is walking around an object and is seeing different sides of the object. Other objects, such as a simple banner sprite, always face the user so that, for example, it is not necessary for the user to be in a particular position to read necessary text information.

The specific selection of file formats, viewer processes, environment features and user interface provides a simple, efficient and versatile system for modeling and using three-dimensional environments over a bandwidth limited network such as the Internet.

One aspect of the invention provides a viewer program executing on a computer system for generating a display of a three-dimensional environment. The computer system includes a processor coupled to a display and a primary storage device. The computer system is coupled to a secondary storage device via a network. The viewer program includes the following components: a download process to download, via the network, a symbolic map stored on the secondary storage device; a symbol parsing process to parse the symbolic map for one or more symbols; a media retrieval process for retrieving prestored media information associated with the symbols from the primary storage device; and a rendering process for rendering a display of a three-dimensional world based on the media information.

BRIEF DESCRIPTION OF THE DRAWINGS

FIG. 3A is a first symbolic map;

FIG. 3B is a second symbolic map;

FIG. 3C is a third symbolic map;

FIG. 3D is a fourth symbolic map;

FIG. 3E is a fifth symbolic map;

FIG. 3F us a sixth symbolic map;

DETAILED DESCRIPTION OF A PREFERRED EMBODIMENT

The source code in the Appendix should be consulted for details of specific features of the preferred embodiment. Although many features are presented here, only a subset of the features will be present in a first release of the system of the present invention and only a subset of the features are implemented in the source code.

Figure 1:
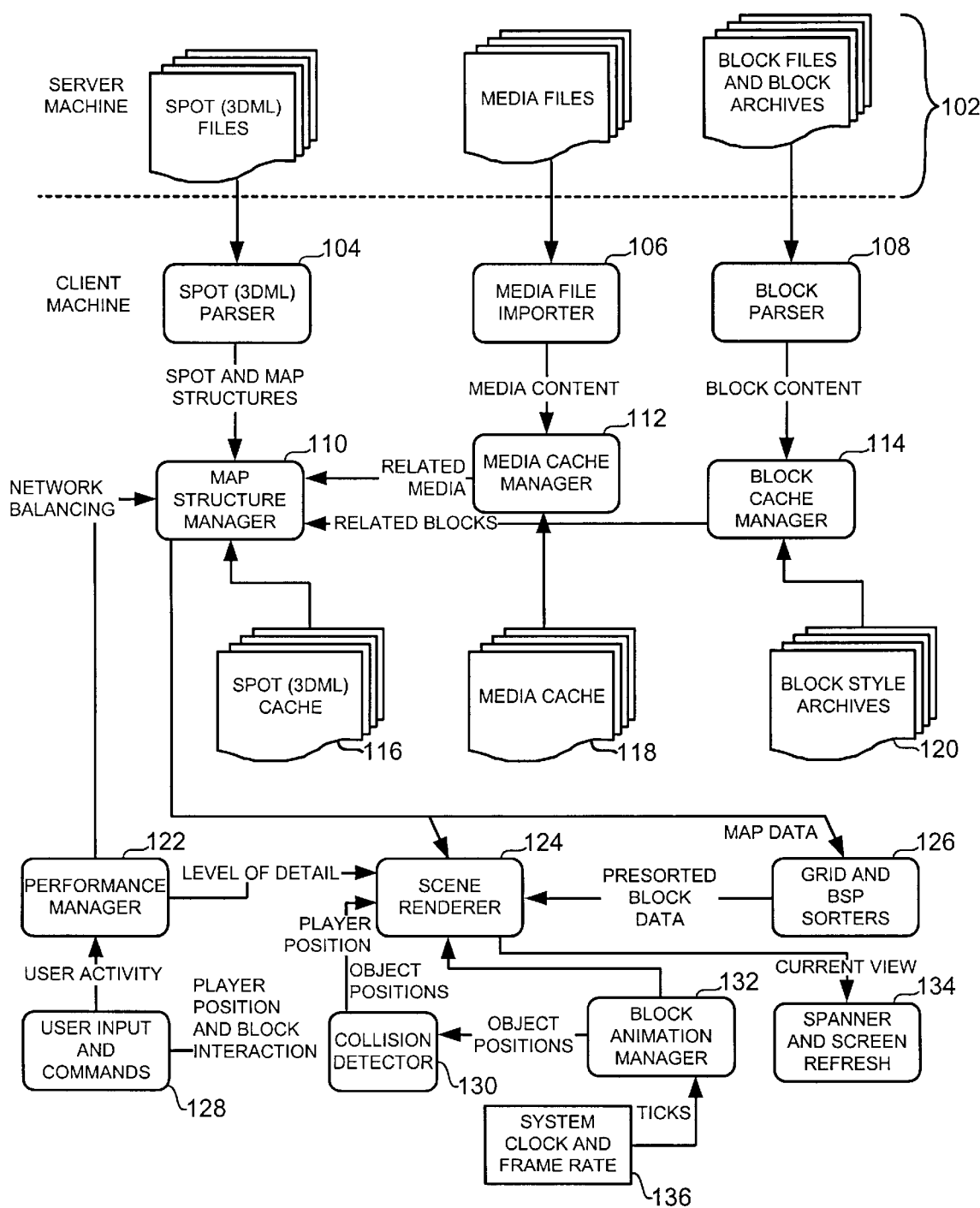
FIG. 1 is a system overview showing files and processes used in a preferred embodiment of the present invention.

FIG. 1 is an overview of the system of the present invention. FIG. 1 shows files and processes used to implement a preferred embodiment of the invention.

In FIG. 1, files at 102 reside on a server machine. The remainder of the processes and files shown below server files at 102 reside on a client machine. For example, in the preferred embodiment, a client machine can be a desktop, laptop, workstation, etc., computer connected to a network such as an intranet or the Internet. In the preferred embodiment the server files can reside on any computer connected to the Internet. Other embodiments can use other network interconnections, or can operate as a standalone system with all of the files local to a user's machine.

Server files include a "Spot" file that is the highest-level description of the three-dimensional environment. Along with Spot files are Block and Media files. Additionally, Style files are used to associate block files with symbols. They are not shown separately in FIG. 1 but are discussed below along with a detailed discussion of Spot, Block and Media file formats and usage. Briefly, the Block file contains a description of objects that are displayed in the three-dimensional environment. The Block files provide a relatively low-level description of objects where object substructures such as polygons and vertices can be specified as components making up parts which in turn can be put together to make up objects. Typical objects can be, for example, a wall, tree, house, etc.

The Block file references Media files for image, audio, and other media. For example, a Media file might provide an image, texture map, sound snippet, etc., that is associated with an object according to the Block file.

The Spot file, in turn, specifies which blocks, or objects, in the Block file are to be used in the three-dimensional environment and specifies the positions of the blocks. The Spot file can also refer to a media file to provide a specific image, sound, or other media. Spot and Block files are written in a text format that includes basic HTML features such as tags. The format for Spot and Block files is an ASCII mark-up language format that can be easily grasped by authors already familiar with HTML. Media files incorporate standard files already used throughout the Web industries, such as .GIF, .WAV, etc. file formats. Any media file format can be supported. The separation of the three-dimensional environment specification into these three types of files on the server side provides a basic organization and modularity to developing three-dimensional environments. Further, this organization allows information to be reused. For example, a Block file can define a tree object that can be accessed several times by a single Spot file and can be accessed by many different Spot files. Naturally, other ways of organizing the files or information on the server side are possible. For example, two or more of the Spot, Block and Media files can be grouped into a directory, group of subdirectories, or "package," for portability. Other file, or information, arrangements are possible.

FIG. 1 shows processes executing on the client machine. Each process is shown as a square with rounded corners. For example, Spot Parser 104 executes on the client machine to download and parse information in Spot files. In the preferred embodiment, all of the processes on the client machine side are part of a "viewer" program. The viewer can be a separate application program or it can operate in connection with an HTML browser as a "plug-in." Although the processes shown in FIG. 1 are discussed as belonging to a single viewer program, or process, it should be readily apparent that many ways of organizing the processes are possible. The invention can be practiced without the existence of all of the processes shown in FIG. 1. Additional processes can be used to add features to the invention.

FIG. 1 shows Media File Importer 106 used to access information in the Media files. Block Parser 108, similarly, accesses the information in Block files.

Although Spot, Block and Media files are shown residing on a server machine in FIG. 1, a first step will often be to make local copies of the information on a client machine that is executing the viewer so that the input file information can be accessed more quickly. In the present embodiment, block, style and media files are assumed to reside locally on the user's computer. Typically, local disk storage is a first level of local storage that provides relatively large capacity and fast access to the information. Secondly, local random access memory (RAM) in the client computer system provides an even faster, although limited size, storage resource. The local storage media is managed by processes 110, 112 and 114, which control the downloading (from the Internet) and storage and access of Spot, Media and Block files, respectively.

Thus, FIG. 1 shows that portions of Spot, Media and Block files reside locally at the client machine as portions 116, 118 and 120. Throughout the course of the viewer's operation, information Spot, Media and Block caches and files may reside in system RAM, hard disk, or other local or remote storage. The viewer attempts to optimize performance by placing information needed to render a current display in system RAM. However, as is known in the art, information may be swapped in and out of system RAM and in and out of various other storage devices in order to optimize performance. Storage allocation is a tradeoff between faster viewer execution and allowing other applications to have storage resources. In the preferred embodiment, for example, the texture cache is designed to use 4 megabytes of system RAM.

Map Structure Manager 110 acts as a control for Scene Renderer 124 and Grid and Binary Space Partition (BSP) Sorters 126. Map Structure Manager 110 does this in response to a network balancing function performed by Performance Manager 122 although this is not implemented in the current version of software. In a future version, network balancing includes adjusting the level of detail of the rendered display, the number of frames per second (fps) and other factors in the display to take into account the rate of data to be displayed and the performance of the user's computer system. As discussed below, one level of detail adjustment includes the depth to which objects in the scene are shown in the rendered display. That is, where it is difficult for the viewer program to display many objects far into the distance, some of those objects in the distance are omitted beyond a set threshold. The threshold distance is adjusted by Performance Manager 122. Other adjustments in performance which will be available to the Performance Manager include selecting whether to use high density or lower density object model Block files. If a user's computer executes the viewer program relatively slowly, then a group of Block files (i.e., a "Blockset") using less information to define each object is used. In the preferred embodiment, three blocksets having low, medium and high polygon counts can be provided to the user. These are used respectively in cases where the CPU in the user's computer is, e.g., a Pentium 200, P2-300, or P2-300 with a 3D chip. For example, the tree object in a low resolution blockset may have less than 20 polygons, the same tree object may have about 100 polygons in a medium polygon blockset and have about 350 polygons in a high resolution blockset. In the preferred embodiment, the performance manager decides prior to viewer frame generation which blockset to use based on the performance ability of the user's computer. Another possibility is to use lower resolution blocks for distant objects and the highest resolution blocks (or the highest resolution that the user's machine can support) for near objects.

User Input and Commands Process 128 provides user interactivity by accepting signals from a user input device, such as the keyboard or mouse, to change the user's viewpoint within the three-dimensional environment. In different modes of the operation, the user may see a first-person point of view or may see an over-the-shoulder view from behind a character sprite representing the user. Essentially, the user's actions move the viewpoint position and line-of-sight direction. The user is also able to perform other operations, such as clicking on hyperlinks, setting viewer parameters, etc. Future versions of the system can allow the user to have more interaction, such as by turning on and off lights, "touching" objects to pick them up, put them down, move them to another location, add the object to the user's sprite character (i.e, "wear" the object). Enhanced sprite movement can be shown such as running, jumping, flying, swimming, etc.

Scene Renderer 124 accepts map data information from Map Structure Manager 110 and level-of-detail information from Performance Manager 122. Other information is also provided to Scene Renderer 124 as indicated in FIG. 1. Scene Renderer 124 generates a scene, or frame, in the three-dimensional environment based on the viewpoint position, symbolic map definition, Block data and other factors. Although Scene Renderer Process 124 uses many computer graphic techniques to generate a scene, the use of symbolic map and object data aligned in a rectangular grid pattern results in very efficient view generation and collision detection. This approach is discussed in detail below in connection with the Viewer. The format of the Spot and Block files that defines the general structure and processing of data in Scene Renderer 124 is discussed in more detail below.

Processes 130, 132 and 134 handle additional aspects of the viewer, such as detecting when a user collides with an object in the three-dimensional environment. Future versions of the software will allow movement of block objects. These modules make sure that as blocks move they still display in the proper order (i.e., whether they are "in front of" or "behind") with respect to other objects even though the moving objects do not have their original specified grid position according to the symbolic map. Spanner and Screen Refresh 134 interprets the 3D model space into a 2D image and display the image. Spanner and Screen Refresh 134 can use any traditional computer graphics techniques, e.g., z-buffering, binary space partitioning, to achieve a fast frame rate. An advantage of the invention is that the ordering of objects on a grid—a direct result of the structure of the symbolic map—allows very fast computation of sorting, clipping and rendering objects. System Clock and Frame Rate 136 provides synchronized updating of frames in the display for smooth viewing and for real-time animation. The preferred embodiment attempts to maintain a minimum frame rate of 15 fps at 640×480 pixel resolution with 16-bit color.

In order to disclose the invention in accordance with the above system overview, a description of computer and network hardware suitable for use with the invention is disclosed in Section A. Next, the use of a symbolic map file to define a three-dimensional environment is explained in Section B. A detailed discussion of the file formats of the Spot and Block files is then discussed in Section C. A detailed discussion of the execution of the Viewer is presented with the use of flowcharts in Section D. Finally, additional refinements and features of the invention are presented in Section E.

A. System Hardware

Figure 2A:
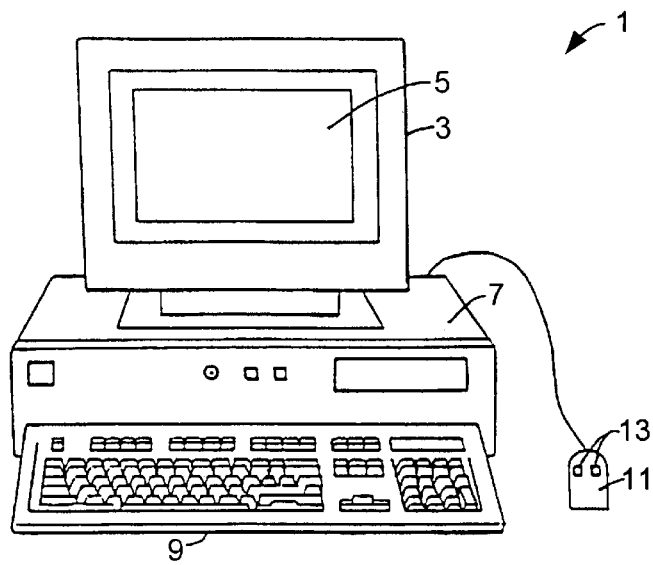
FIG. 2A is an illustration of a computer system suitable for executing the viewer and related software of the present invention.

FIG. 2A shows a basic computer system 1 suitable for executing the software of the present invention. Computer system 1 includes a display device 3 with a display screen 5. Cabinet 7 houses additional components of the computer system (not shown) such as a processor, memory, disk drive, compact disc read only memory (CD-ROM), etc. Keyboard 9 and mouse 11 are standard user input devices. Mouse 11 includes buttons 13 for facilitating user input.

Figure 2B:
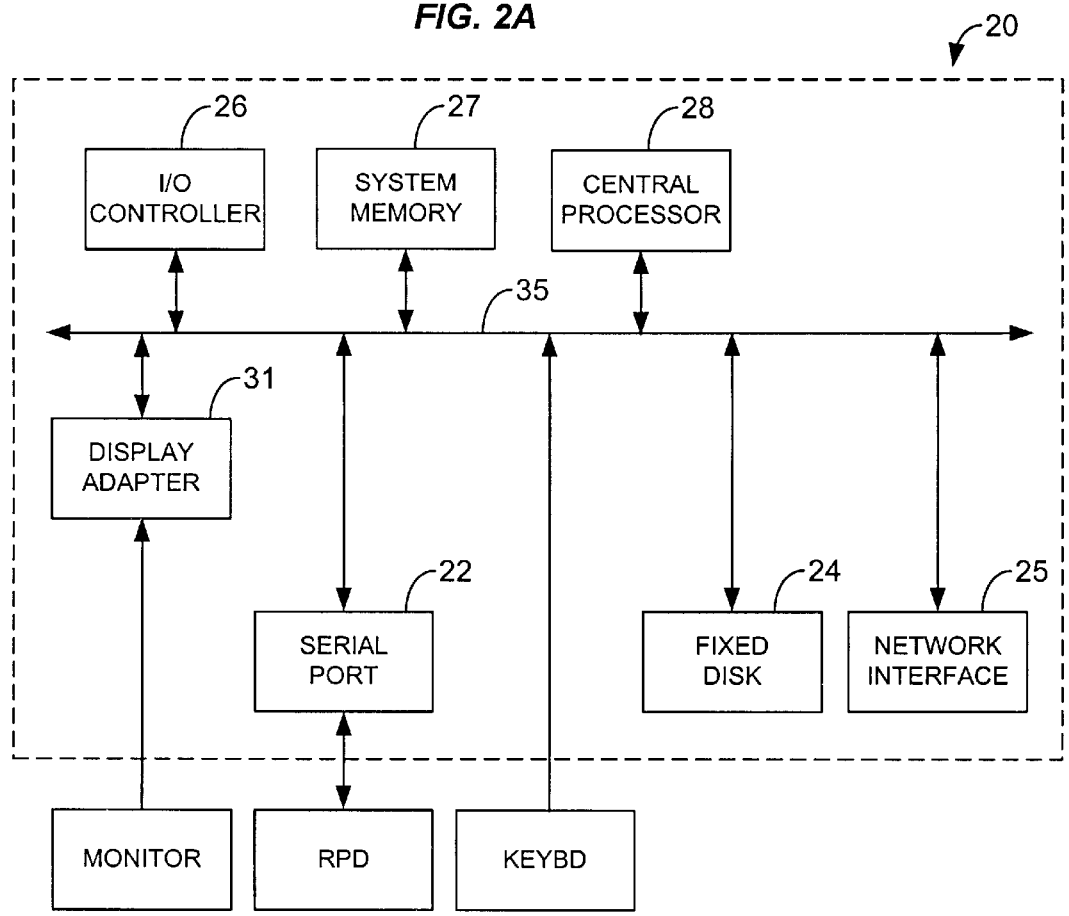
FIG. 2B is a diagram of subsystems in the computer system of FIG. 2A.

FIG. 2B shows several subsystems of the computer of FIG. 1 interconnected via a bus 35. Central Processing Unit (CPU) 28 communicates with system random access memory (RAM) 27, fixed disk 24, input/output (I/O) controller 26, display adapter 31, serial port 22 and network interface 25. Some subsystems interface to user input and output devices such as the monitor, "mouse," and keyboard which are also shown in FIG. 2A. Network interface 25 is used to connect the computer system to additional external computer systems on a network. Many other configurations of subsystems are possible. A computer system suitable for use with the present invention can use less subsystems, components or devices than those shown in FIG. 2A. For example, a handheld computer may include only a processor, memory (both RAM and read-only memory (ROM)), small display screen and keyboard. Also, computer systems suitable for use with the present invention may include more subsystems than are shown in FIG. 2A. For example, the handheld computer may include a PCMCIA card interface for storing and retrieving data from an external card.

Figure 2C:
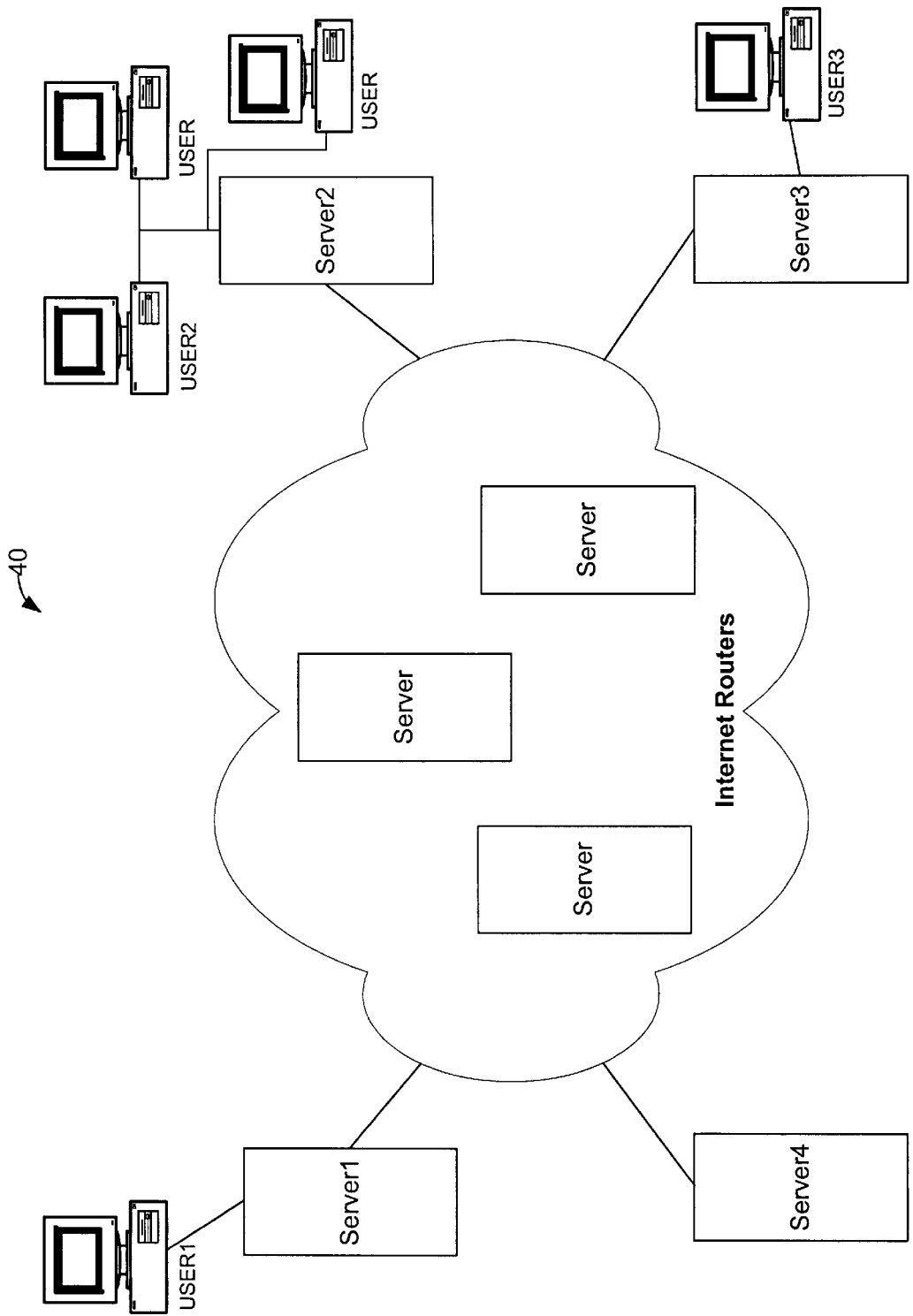
FIG. 2C is a diagram of a generalized computer network suitable for use with the present invention.

FIG. 2C shows a generalized computer network 40.

In FIG. 2C, servers may be interconnected by any communication means and in any network topology. For example, the servers can be connected by hardwire, radio frequency transmissions, infrared transmissions, etc. They can be connected in star, ring, daisy chain, etc., schemes. Also, any communication protocol such as Ethernet, IEEE 1394 or Transmission Control Protocol/Internet Protocol (TCP/IP) can be employed.

User computers are shown connected to the servers. Again, the interconnection between the computer clients and the server, or servers, can be by any means, topology and protocol as is known. Additional servers having any number of additional computer stations can be added to the interconnected network of FIG. 2C. Although the specific embodiment of the invention may be discussed with reference to a program, process, file, data structure or other object residing on, or executing within a single computer, it should be apparent that the objects can also be distributed over, and execute on, two or more computers.

B. Symbolic Map

The preferred embodiment uses a "Spot" file to define the position and types of blocks, or objects, in the three-dimensional environment. At the heart of the Spot file is a symbolic map representation of the three-dimensional environment.

Figures 3A, 3B, 3C:
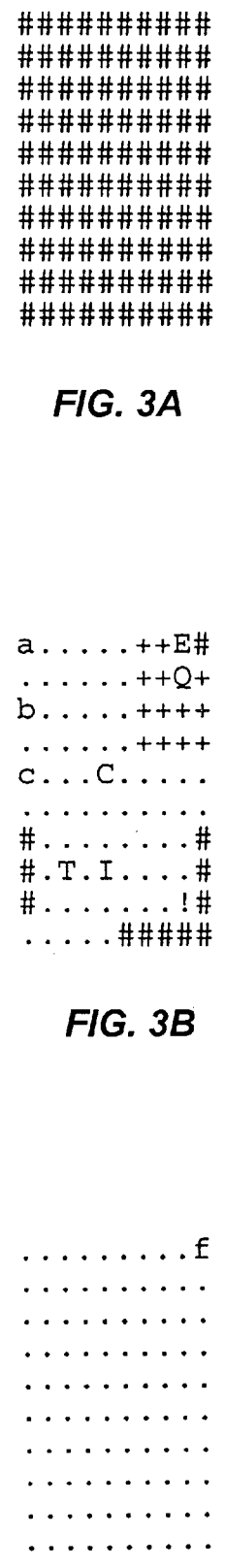

Each of FIGS. 3A–C shows a single level in a three-level Spot. FIG. 3A corresponds to the ground level. FIG. 3B corresponds to the next level up from the ground. FIG. 3C corresponds to the top level, farthest away from the ground.

In the preferred embodiment, plain-text character symbols in the American Standards Code for Information Interchange (ASCII) format are used to create a symbolic map that defines the three-dimensional environment. The symbols are laid out in a rectangular grid pattern with one text character per space in the grid. As can be seen from FIGS. 3A–C, three levels of a 10×10 grid have been defined to describe the spot.

Each grid location corresponds to a square area in the three-dimensional world. Each grid location also corresponds to a height so that each location actually defines a cube. In the preferred embodiment, the cube is 256×256× 256 pixels. These dimensions make it easier to design texture maps for the objects. However, this choice of dimension is somewhat arbitrary and other dimensions can be used without affecting the visible performance. Each of the three 2-dimensional symbolic maps of FIGS. 3A–C are stacked one above the other to form the third dimension. This approach provides a very simple, intuitive and accessible format for a Web author to generate the symbolic map defining a spot. That is, FIG. 3A is the grid for the first level, or floor, of the spot. FIG. 3B defines objects that are sitting on the ground level. FIG. 3C defines an object at the next level above the ground level.

In FIG. 3A, the text symbol "#" is used to define a block for the ground, or floor. As discussed below in connection with spot, block and media file formats, each symbol can be mapped onto different blocks or given different properties and attributes. The preferred embodiment provides a basic block set in which useful primitive objects such as walls, blocks, trees, etc. are predefined.

FIG. 3B shows other text characters corresponding to various objects in the three-dimensional world. Again, these objects, or blocks, are predefined in the block set library. Additionally, a Web author (i.e. "spot" author in this case) can assign symbols to objects that are custom-made and available from anywhere on the Internet or locally in the user's computer system.

In FIG. 3B, the symbol "a" corresponds to a tree. The symbols "b" and "c" also correspond to trees although with different properties. The properties are discussed in detail below. The symbol "#" in FIG. 3B represents the same object as the symbol "#" of FIG. 3A. Although it is called a wall, it is actually a cube painted with a checkerboard pattern. Thus, the object can act as both a surface for walking on or as a wall, pedestal, etc. A feature of the present invention is that objects, or blocks, can be used as building blocks to create many different three-dimensional forms in a very simple manner. Other characters in FIG. 3B include "C" which corresponds to a sprite or bitmap image discussed below. The symbol "T" is not defined in the Spot file so its default value of association with a tree block is maintained.

Symbol "I" corresponds to another sprite image. Symbol "!" corresponds to a floodlight block.

Symbol "+" corresponds to a slightly raised floor, or platform, object. Symbol "E" corresponds to a ramp object. Symbol "Q" corresponds to a hyperlink "teleporter."

In FIGS. 3B and 3C, the symbol "." corresponds to an empty space and is merely a place holder for the grid layout.

In FIG. 3C, the symbol "f" is a floor object.

Figure 4A:
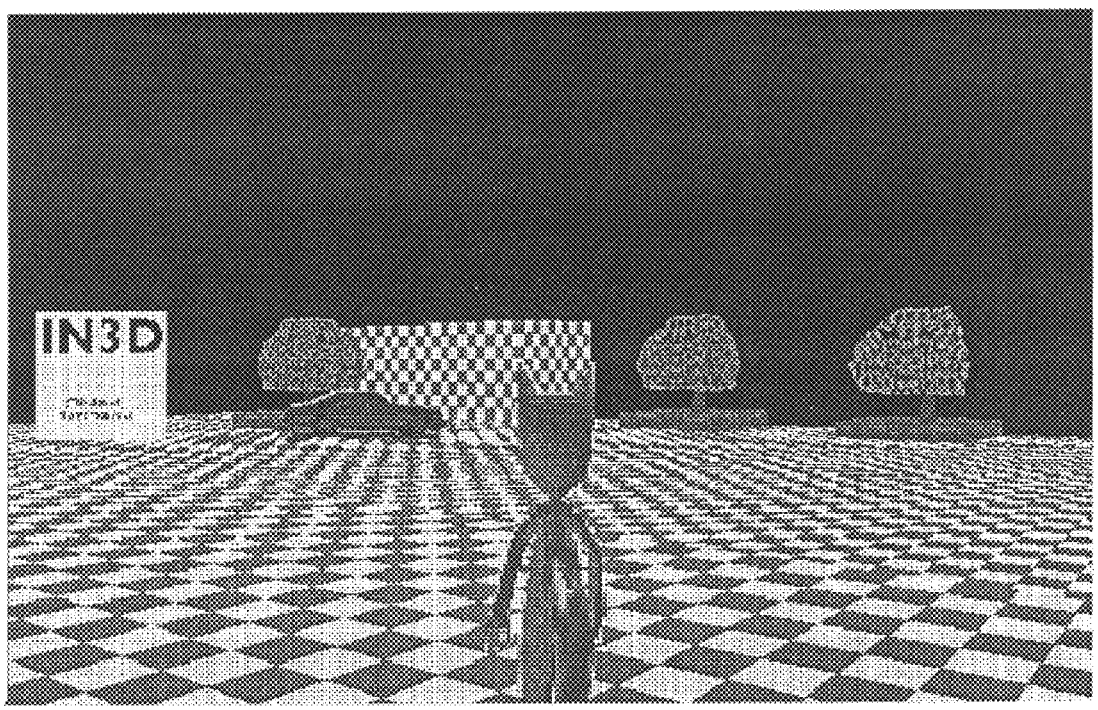
FIG. 4A–S are screenshots of displays generated from the symbolic maps of FIGS. 3A–F.
Figure 4B:
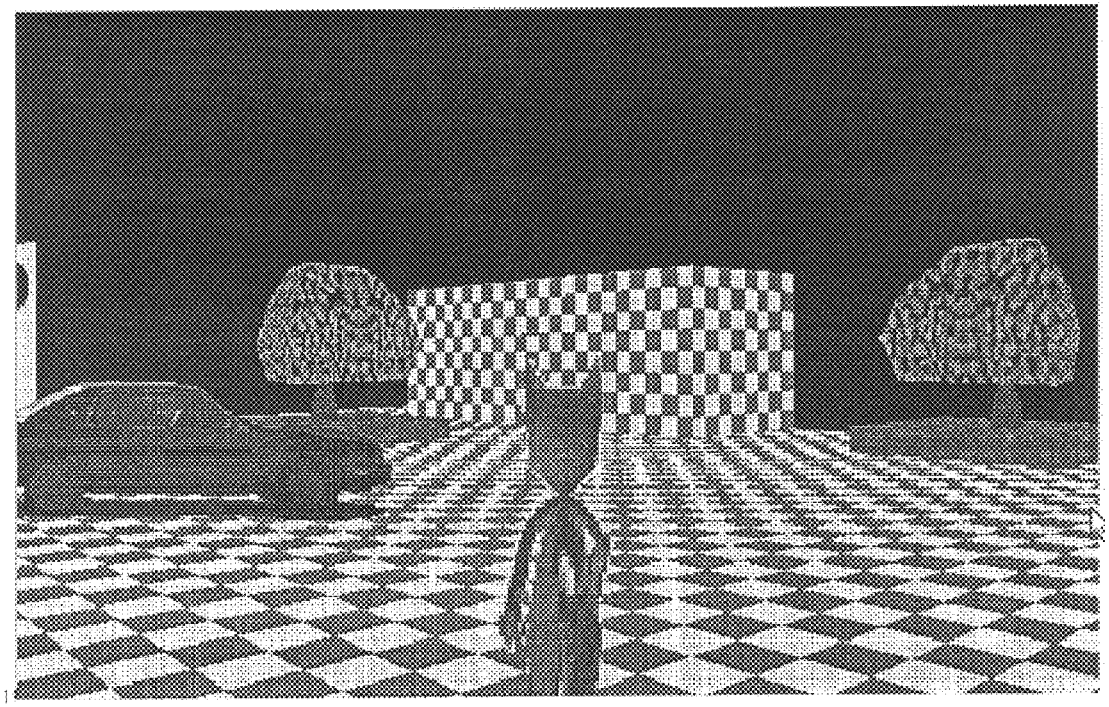
Figure 4C:
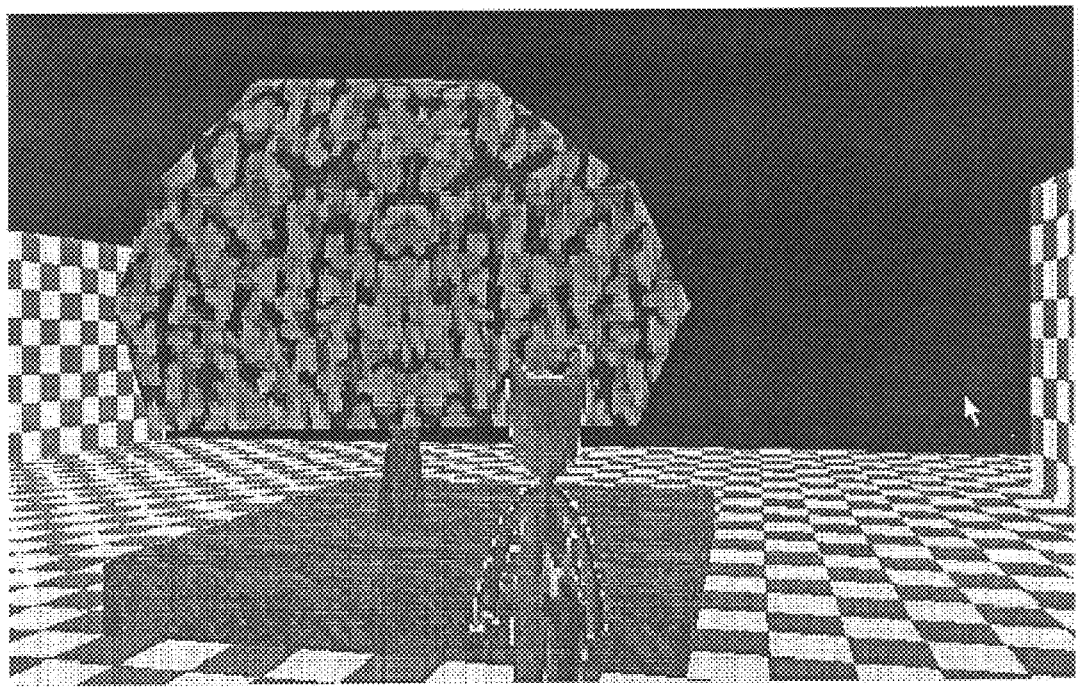
Figure 4D:
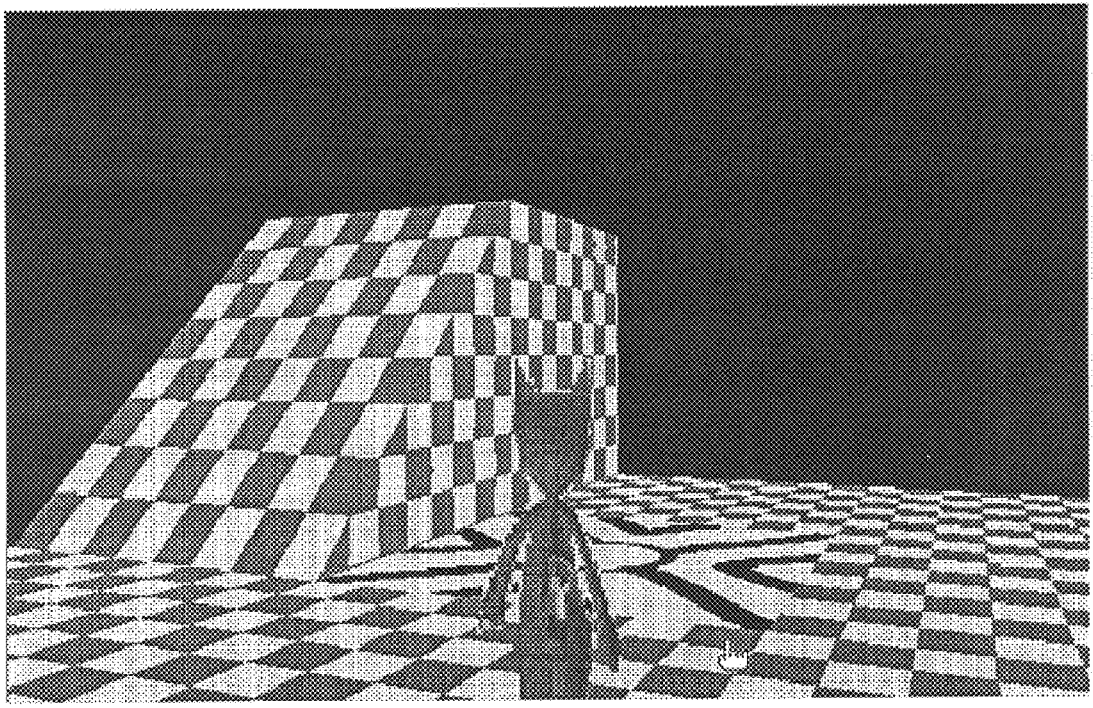
Figure 4E:
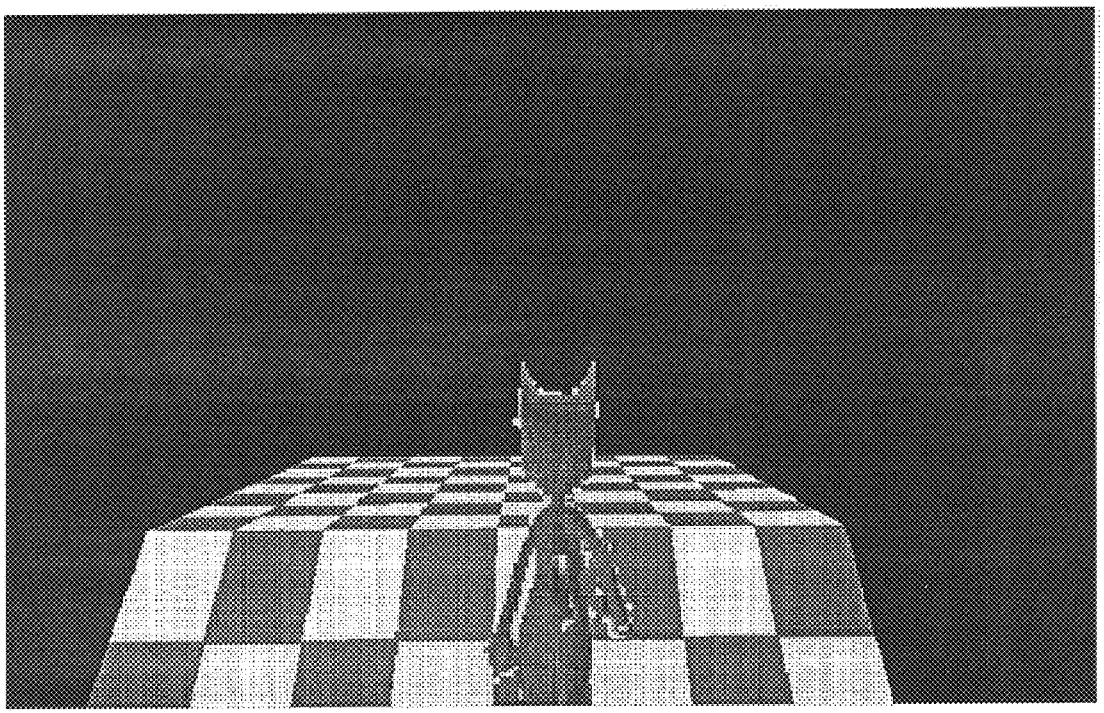
Figure 4F:
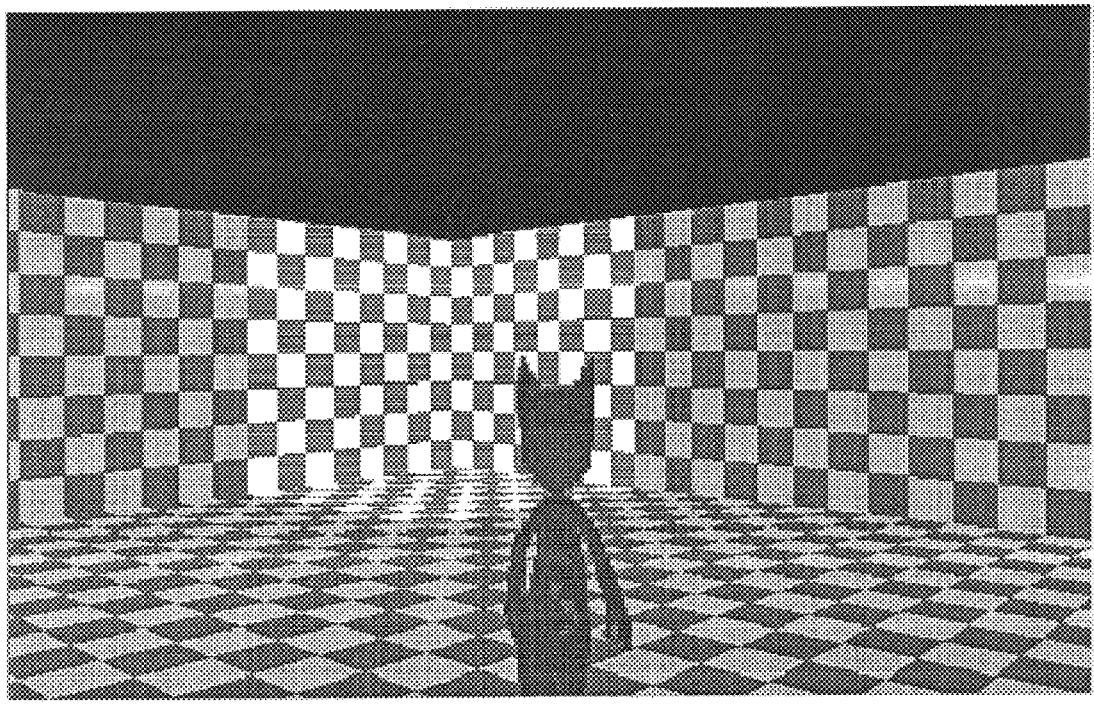
Figure 4G:
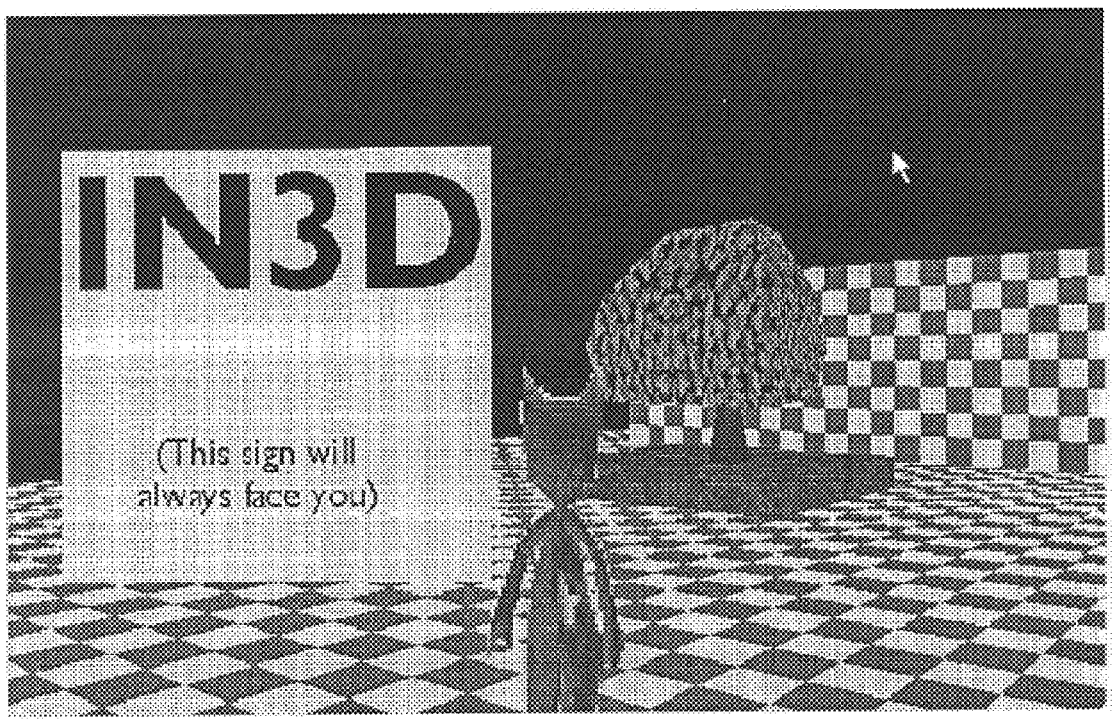
Figure 4H:
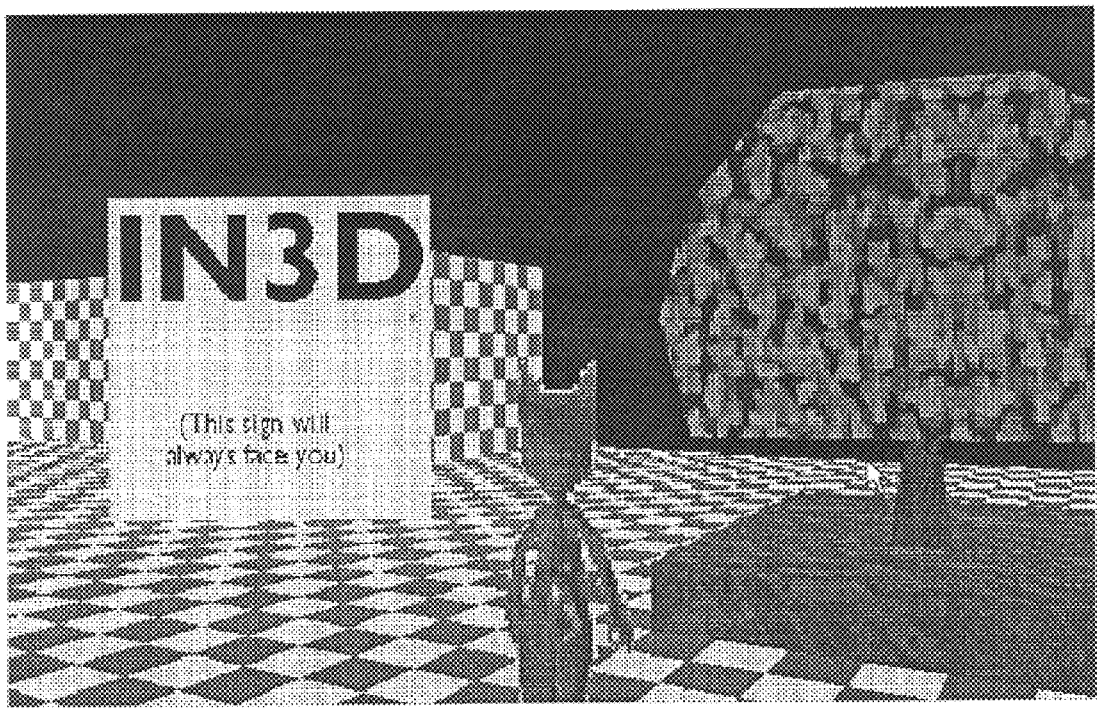
Figure 4I:
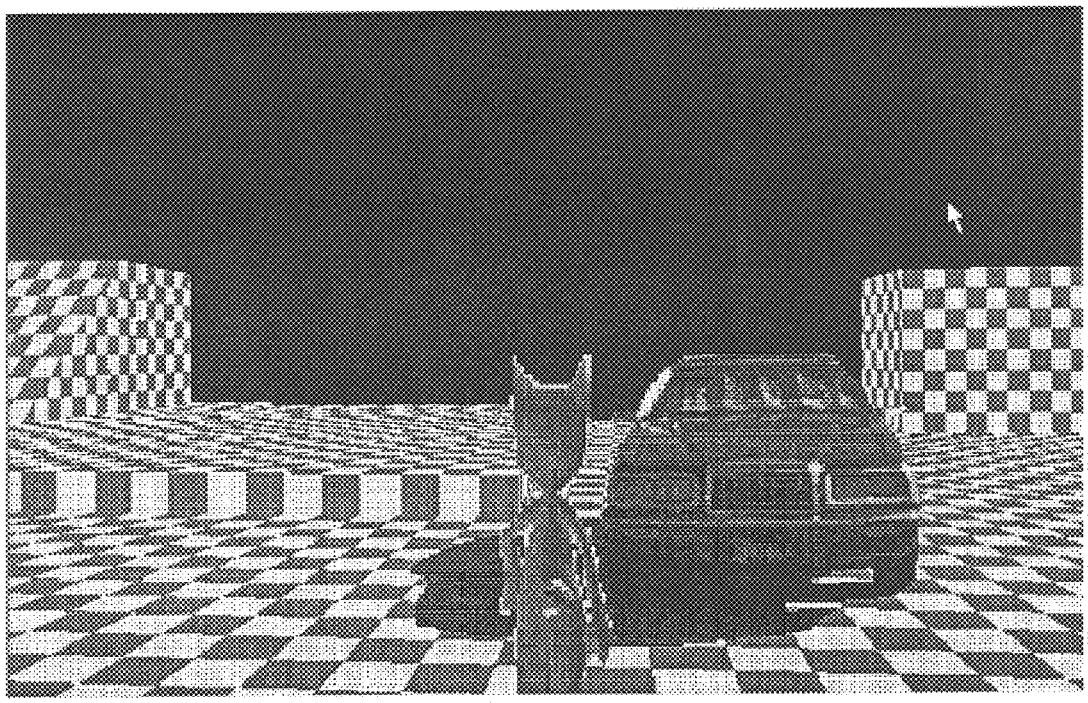
Figure 4J:
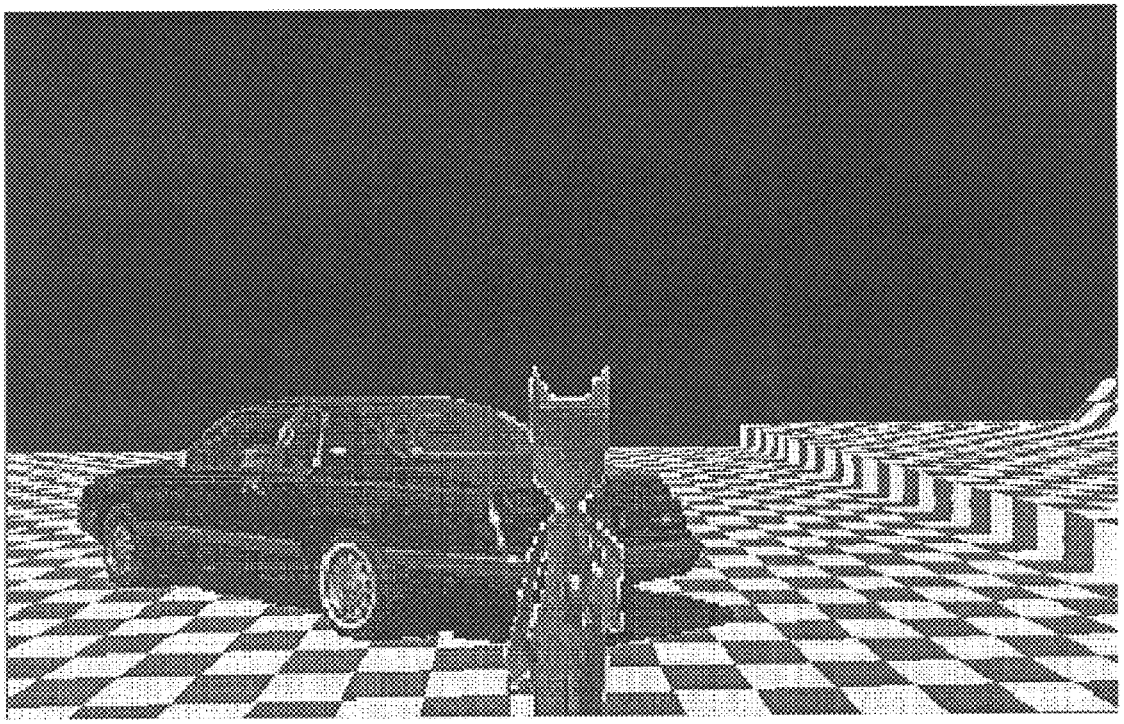
Figure 4K:
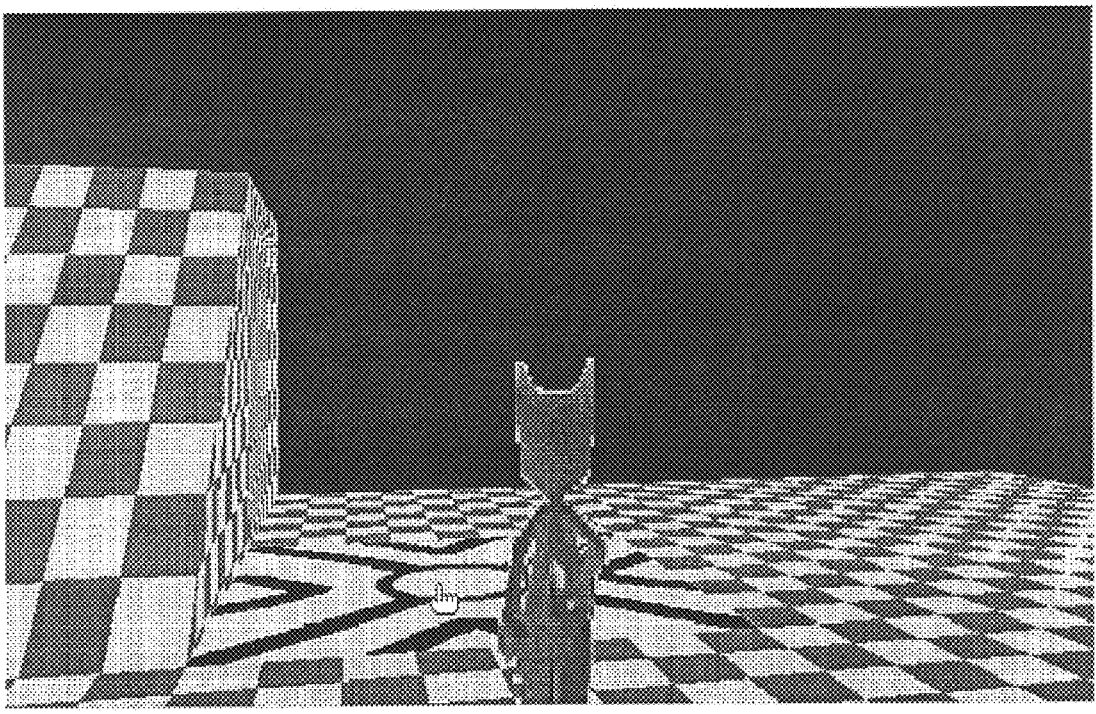
Figure 4L:
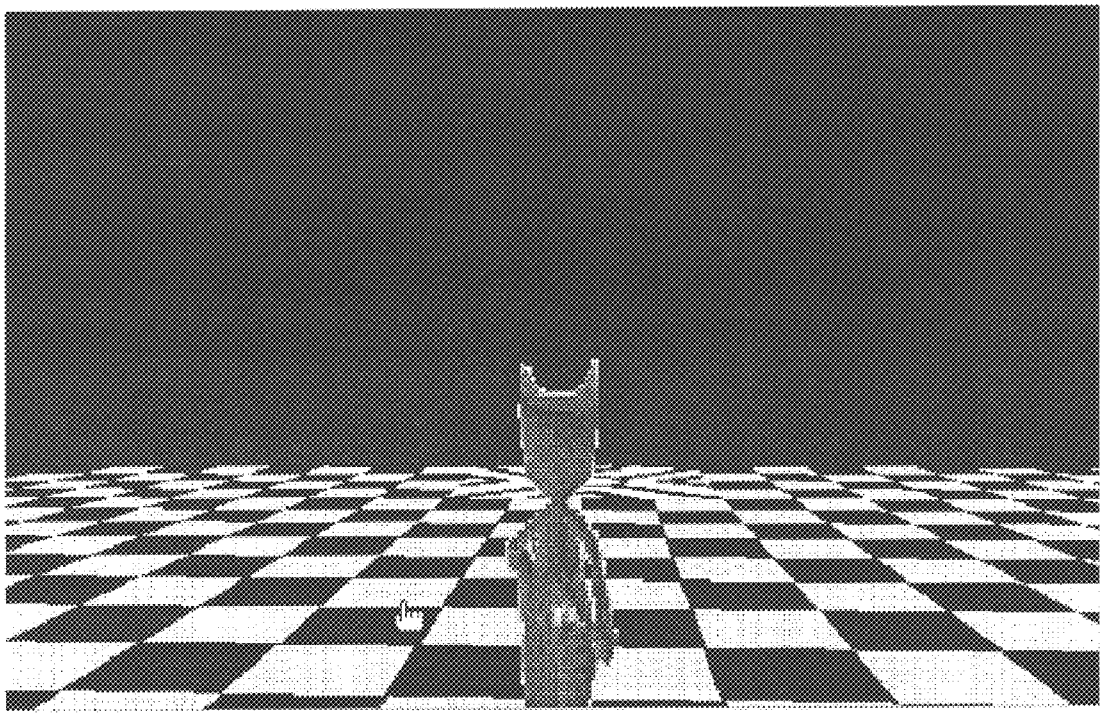
Figure 4M:
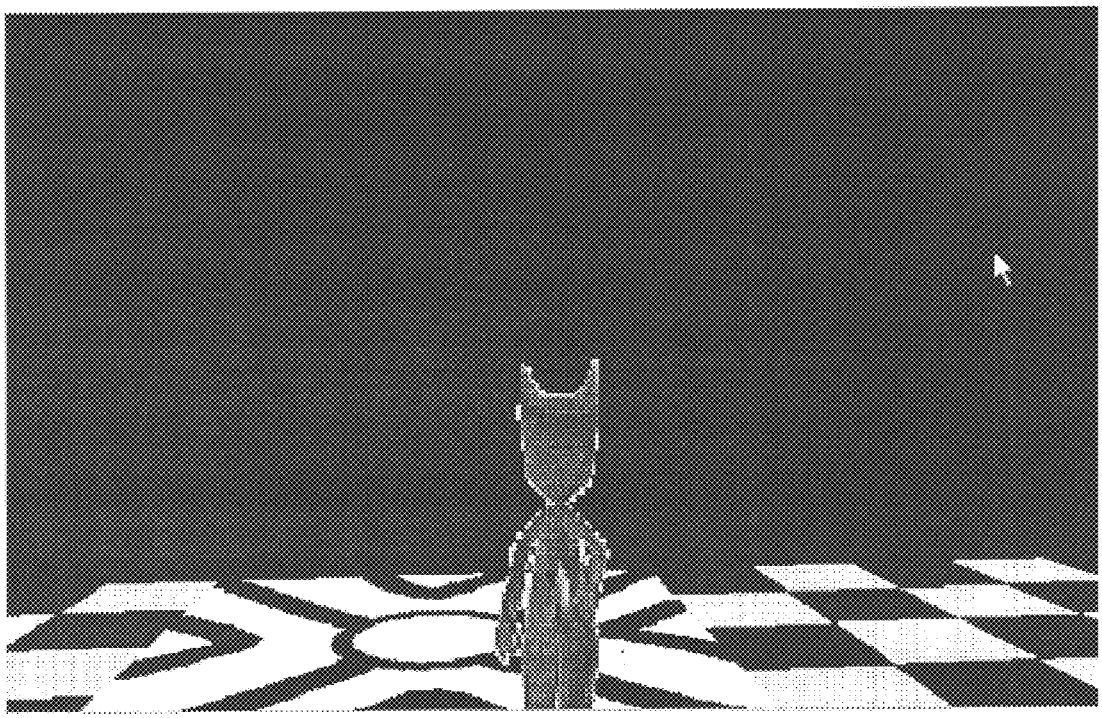
Figure 4N:
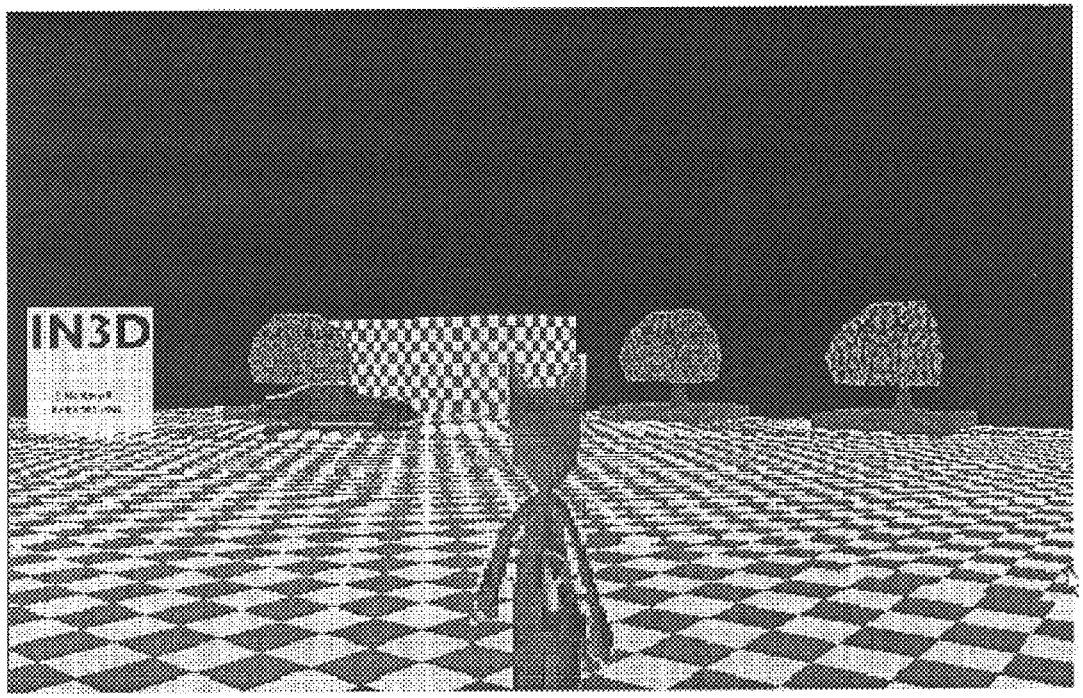
Figure 40:
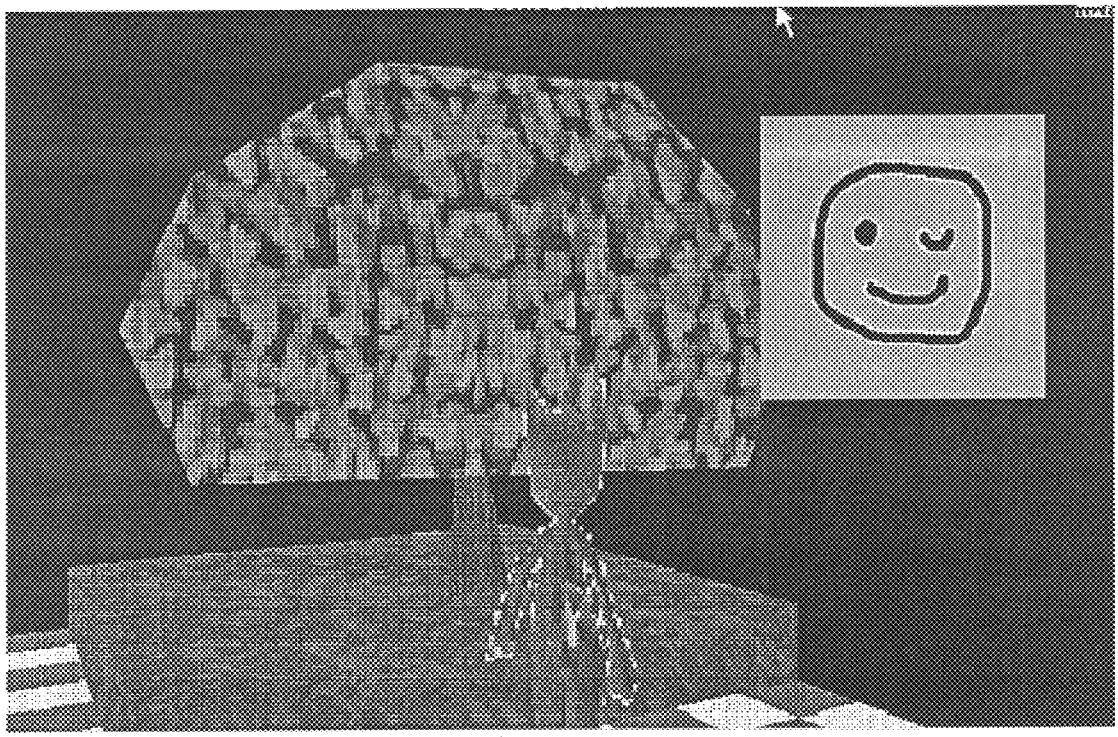
Figure 4P:
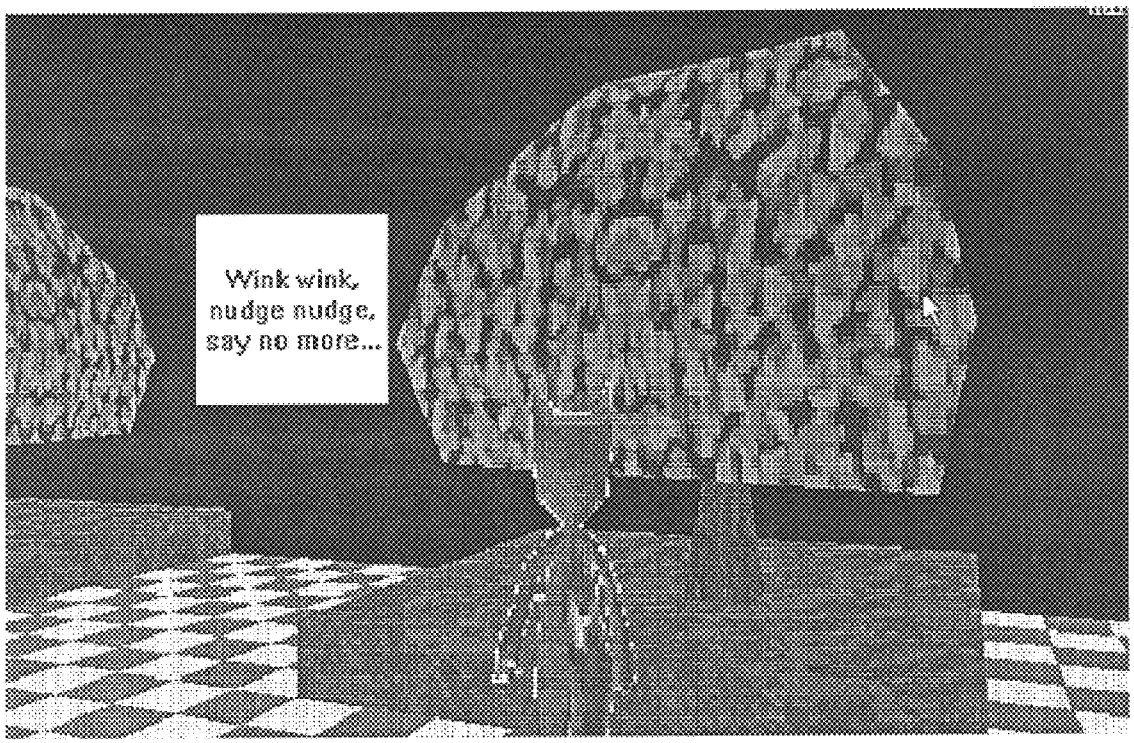
Figure 4Q:
Figure 4R:
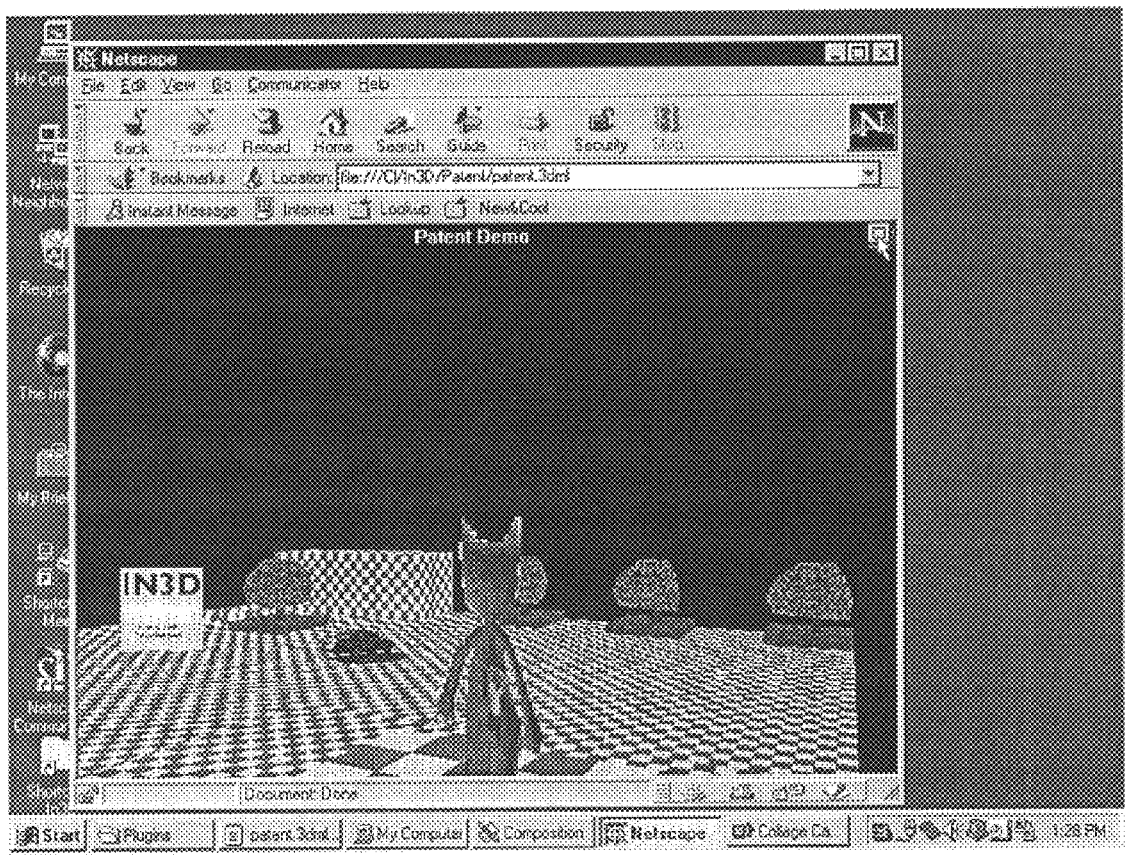
Figure 4S:
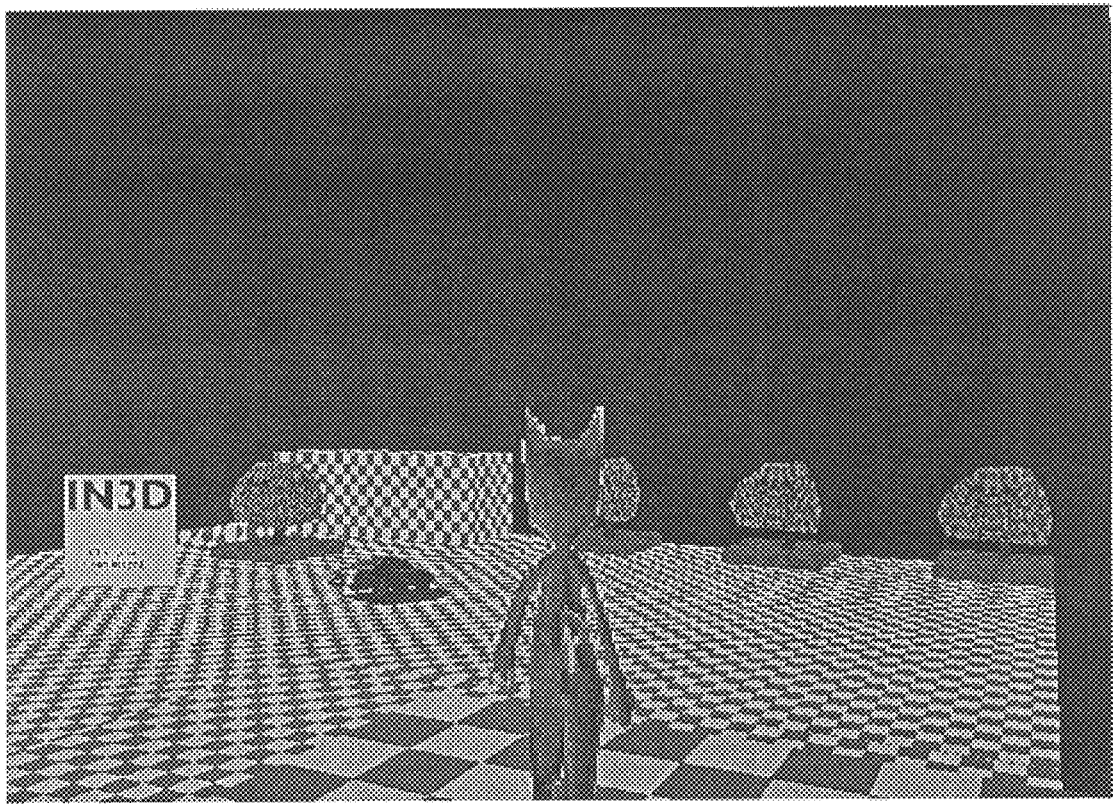

FIGS. 4A–S show screen displays generated by a version of the viewer of the present invention using the symbolic of FIGS. 3A–C.

FIG. 4A shows a first screenshot with a sprite character depicting the user's alter-ego presence (that of a cartoonish cat) in the three-dimensional world. The user's viewpoint is that of looking over the shoulders of their sprite character. Within view are three trees, with a sign, or banner, with the letters "IN3D," a car and a wall in the background.

FIG. 3D shows how the objects in the rendered scene of FIG. 4A map to the symbolic map. In FIG. 3D, the user's viewpoint location is shown by a dark circle at about grid position column 6, row 3. The user's line of sight is directed downward and to the left. The field of view is shown in FIG. 3D by the emanating lines at about a 90° angle.

From a comparison of FIGS. 3D and 4A, it can be seen that objects in the rendered view correspond to symbols in the symbolic map as follows (going left to right in the scene of FIG. 4A): Character "I" maps to the "IN3D" banner, symbol "T" maps to a tree, symbol "C" maps to the sprite image of a car, three symbols "#" map to the wall in the background center, symbol "c" maps to a tree, and "b" maps to a tree.

FIG. 4B shows another screenshot after the user has moved slightly forward and has changed the angle of view slightly. FIG. 4B is shown in correspondence with the symbolic map file according to FIG. 3E. Note that, as the viewpoint has approached the wall objects in the center background, some of the objects visible in the screenshot of FIG. 4A are no longer in view. This is shown corresponding with the symbolic map of FIG. 3E where the user's position and line of sight are slightly modified. Note that the user is not constrained to moving their sprite, i.e. their viewpoint, in block steps. Rather, the user experiences smooth scrolling through the three-dimensional environment. In fact, the degree of resolution and other presentation "level of detail"

effect such as frame rate, depth of field, etc. can compare with state-of-the-art graphics engines such as those used in standalone computer games where all of the models and information to create a three-dimensional environment are local to the user's machine.

Thus, it is apparent that the use of a symbolic map, particularly where the symbols are single-text characters laid out in a grid fashion, provides a powerful, simple and intuitive system for creating a three-dimensional environment.

Although the preferred embodiment uses a single text character symbol, or descriptor, per grid location in the symbolic map, many other descriptor types and approaches are possible. For example, two or more text characters per object, or block, can be used. In this case, two or more characters per grid location can be employed. Also, the symbols may be non-alphanumeric. For example, they can be icons or small bitmap images.

Also, the map need not be rectangular, or even grid-like. For example, the symbols can be laid out in a standard map-like form where grid position fillers such as the "." symbol are not used. In this case, an application program would be provided to allow the user to, i.e., drag and drop symbols in different locations in a two-dimensional map. The map can be converted into symbols (e.g., text or other symbols) and used as the input to the viewer as described herein.

The symbolic map need not be stored in map form. In fact, the format of even a text file is a "flat" file when it is stored in a storage medium. That is, the symbolic map, or text map, assumes the form of a string of binary numbers without dimensional form. Many representations such as associating a symbol with x and y coordinate information in a file are possible. Note, however, that as the symbolic map representations become more and more abstract, as with the order of presentation above, it becomes more difficult to intuitively grasp the correspondence between the symbolic map file and the end result of the three-dimensional environment. Moreover, the use of frame-text ASCII characters allows a symbolic map of the type according to the present invention to be created with many existing text processing applications already available. Further, the symbolic map can be easily printed out, transferred and generated by other programs, servers, database applications, via templates in tools, etc.

The single-character text representation that uses different characters to correspond to different type objects, and that uses grid placement to define the relative positions of the objects, has the advantage of being very compact so that the download time over a bandwidth-limited network such as the Internet is minimal.

Another advantage of the text approach of the present invention is that different symbolic maps created by different designers can be easily connected, or juxtaposed, with each other. The effect is identical to that achieved with a manual cut-and-paste of the hard copy versions of the symbolic maps. Other features of the approach of the present invention, and variations on the approach, are discussed below.

FIG. 4C shows a screenshot of a view in the three-dimensional environment after the user has moved forward from the position shown in FIG. 4B. In FIG. 4C, the user's sprite character has bumped into a tree object. In the preferred embodiment, events such as collisions are detected and can result in a predefined result defined by the spot author. In FIG. 4C, a pointer is shown as a white arrow. In typical fashion, the pointer is controlled by the mouse or other computer user input device. The user can move the sprite character, and viewpoint, around by using keyboard keys such as the arrow keys or can direct the character to move by using the mouse pointer by bringing the pointer to right or left edges of the screen to turn and by depressing a mouse button to move forward.

FIG. 4D shows the view when the user has moved his character near the teleport square represented by symbol "Q" of FIG. 3B. The user is able to activate the teleporter, which is essentially a hyperlink, by either moving the sprite character onto the teleport square or by clicking on the teleport square with the pointer. FIG. 4K shows the user's sprite about to walk onto the teleporter. Note that the pointer changes from an arrow to a "pointing finger" icon when the pointer is moved over the hyperlink area, as is standard for indicating hyperlinks. Also shown in FIG. 4D is the ramp which takes the user to another vertical level in the spots. The ramp is represented by symbol "E" in FIG. 3B. At the far end of the ramp is the checked block represented by the "#" symbol, also shown in FIG. 3B.

FIG. 4E shows the user's sprite moving up the ramp of FIG. 4D. Once at the top of the ramp, the user will be at the level represented by the symbolic map of FIG. 3C. Note that, at the level shown by the map of FIG. 3C, the only object defined is the floor as "f."

FIG. 4F shows an example of light sourcing in the three-dimensional environment. The light source, in this case a floodlit area, is created with the "!." In FIG. 4F, note that the existence of a light source block acts to illuminate not only the block itself but objects surrounding the block. That is, in FIG. 4F, the walls around the illuminated block, along with the floor, are brighter than the surroundings. The present invention, as discussed below, provides a spot author with various ways to control lighting, including specifying ambient lighting for the entire spot, sky textures, etc.

FIG. 4G shows the user at a viewpoint near the sprite banner represented by the symbol "I." In the preferred embodiment, a sprite banner such as that shown in FIG. 4G and represented by the symbol "I" is a simple bitmap image of the kind typically found on traditional two-dimensional HTML pages on the Internet. In other words, the bitmap can be a gif, .jpg, etc. bitmap. These bitmaps are found in media files and can be referred to as independent entities. That is, each bitmap can have its own file name, directory path and machine address as specified by a uniform resource location (URL) as a standard on the Internet. This allows the bitmap image to reside anywhere on the Internet and still be used within the three-dimensional environment.

As shown in FIG. 4G printed on the sprite banner, the sprite is always oriented towards the user's viewpoint. Other embodiments can make the sprite only visible from certain viewpoints. For example, it might be desirable to have the sprite resemble a billboard where the user can walk around the back of the sprite, look at it edgewise or in a foreshortened perspective view, etc.

In FIG. 4H the user has moved around the sprite to a new location. FIG. 4H illustrates that the sprite continues to face the user even from a different point of view.

FIG. 4I shows an example of a multi-faceted sprite object in the present invention. In FIG. 4I, the symbol "C" corresponds to a multi-image .gif. Such images have typically been used in Web pages to produce animations by allowing an author to specify how fast the multiple images in the single file should be "flipped" through. The present invention allows for such multi-image .gifs, or other image formats, to be spatially presented rather than temporally presented. That is, each of the multiple images in a multi-image .gif file are presented according to the user's angular viewpoint with respect to a predetermined angle.

As an example, where a multi-image sprite has two images, the first image will be presented to the user when the user is viewing the image from a point upward from the image. In FIG. 3B, this would mean that if the user is anywhere in the top half of the symbolic map looking towards the car sprite "C" the user would see, e.g., a view of the front of the car. When the user is anywhere at the bottom half of the symbolic map looking up towards the car, the user would see the second image of the rear of the car. The present invention allows for any number of images to be stored in a multi-image file. The view then automatically separates the images into different images presented at different angular viewpoints. Specifically, the angle range of presentation is 360 degrees divided by the number of image frames in the sprite file.

As a visual example of this, FIG. 4J shows the user at a different viewpoint facing the car image. Note the user is presented with an image showing a different angle of the car.

FIG. 4L shows the user's view after the user has teleported to a new spot. Upon activating a hyperlink, the viewer obtains a new spot file that has a new symbolic map for the hyperlinked spots. In this case the spot is relatively empty except for another teleporter off in the distance toward the center background of the screen. The symbolic map that is used to generate this new spot is shown in FIG. 3F.

In FIG. 3F, symbol "L" provides the teleporter shown in FIG. 4L.

FIG. 4M shows a view of the user in this second spot as the user moves over the teleporter location corresponding to symbol "L" of FIG. 3F.

FIG. 4N shows the view of the user after the user passes through the teleporter in the second spot of FIG. 4M. Note that the user is in a starting position similar to that of FIG. 4A. The spot author is able to specify starting locations and viewing directions when a user enters each spot.

FIG. 4O illustrates a "pop-up" sprite associated with a block. A design change from the embodiment defined by the source code provided in the Appendix allows pop-up sprites to be placed at any map location without associating the sprite with a block. In the case of FIG. 4O, the pop-up sprite, the winking face, is associated with a tree having the symbol "a" as shown in the symbolic map of FIG. 3B. The present invention allows a pop-up sprite to become visible when the user is within a predetermined range of the block that the pop-up sprite is associated with. As with previous sprites, the pop-up sprite always faces the user. Other possibilities are to allow the pop-up sprite to become visible when the user performs a different action such as, for example, beginning to turn away from looking at the object, bumps into the object, etc. Further, other media can be presented similar to a pop-up sprite rather than just image information. For example, a .wav file can be played when the user crosses a threshold. Threshold detection with respect to a block can also be used to initiate many types of events such as playing an animation, having a block move, teleporting to another spot, changing the brightness, changing the texture map, etc.

FIG. 4P shows a view where the user has approached closely to the tree indicated by symbol "b" of FIG. 3B. This case produces another pop-up sprite with text. This sprite is discussed in detail below as a form of an embedded sprite within the spot file.

FIG. 4Q shows a pop-up sprite that is an image map associated with a tree having the symbol "c" in the symbolic map of FIG. 3B. In FIG. 4Q, the pop-up sprite image map has three clickable areas that can be associated with hyperlinks. In fact, image maps as traditionally used in HTML pages can be used as an associated pop-up sprite with blocks in the present invention.

FIG. 4R shows the viewer running in a browser window. Such an application allows the three-dimensional environment of the present invention to operate seamlessly with existing Web technology. That is, the user can be brought instantly from a three-dimensional environment back to viewing a standard HTML Web page and vice versa. In the case of FIG. 4R, the viewer of the present invention executes as a viewer "plug-in" as it is known in the art.

FIG. 4S shows the viewer of the present invention switching to a full-screen view from the embedded view of FIG. 4R. Switching of the screen mode is performed by using the icon in the upper righthand corner of the viewer display screen shown in both of FIGS. 4R (upper right screen of viewer sub-window) and 4S (upper right corner of the screen).

C. File Formats

The file formats for the Spot and Block files are next presented. As mentioned, the Media file format uses standard file formats of image and audio media popular on the Internet such as gif, .jpg, tif, .wav, .au, etc. Any file format used for storing media in a digital computer can be used as the present invention's media files. A Style file is also discussed in connection with block files.

Spot File Format

The Spot file format uses a markup language similar to HTML. The Spot file format is written in a language called .3DML. The .3DML format is an ASCII markup language that can be edited in a standard text editor and is designed for Web publishing of 3-dimensional worlds. The .3DML format defines tags specific to publishing 3D animated environments on the web (i.e., Spots). The Spots are explored using the viewer of the present invention that can act as a stand-alone browser or as a plug-in to another browser application. At present, only the viewer parses the 3DML format. Another embodiment can allow a parser (referred to as an "XML" parser) to be integrated into a browser. As such, either the viewer, or code in an associated browser application program, can include code to perform the parsing function of the .3DML format.

The heart of the .3DML format is a symbolic map section that uses single text characters to represent individual 3D blocks. A block is an object that is placed and displayed in a Spot. Examples of objects are polygon models of a wall, door, lightpost, elevator, etc. A Spot author simply designs the layout of a 3D Spot using any of 80 or more pre-designed basic 3D blocks. Additional blocks can be designed, imported or referenced so that they appear in the 3-dimensional environment. Authors can customize existing blocks by specifying texture maps, or files, to give the spot a specific desired look.

In the preferred embodiment, all of the basic 3D blocks, textures, etc., are stored local to the user's personal computer (PC). Since using custom blocks and textures requires the user to download these items from the Internet, the Spot author must balance the need for the new textures and graphics with the inconvenience of waiting for their download.

Table I shows the .3DML source code used to generate the Spot that is described above in connection with FIGS. 3A–E and 4A–S. Table II shows the .3DML source for the second Spot discussed in connection with the same Figures.

TABLE I

```
<spot>
<head>
<title>Patent Demo</title>
<style name ="demo"/>
<map dimensions="(10,10,3)"/>
<ambient_light brightness="60%"/>
```

TABLE I-continued

```
</head>
<body>
<create symbol="a" block="tree">
    <POPUP texture="images/face.gif" COORDS="(400,50)"/>
</create>
<create symbol="b" block="tree">
    <POPUP SIZE="(100,100)" COLOR="(255,255,255)"
    COORDS="(100,100)"
    BGCOLOR="(30,30,30)" FGCOLOR="(0,0,0)"
    TEXT="Wink wink, nudge nudge, say no more..." />
</create>
<create symbol="c" block="tree">
    <POPUP TEXTURE="images/imagemap.gif" COORDS="(50,50)"
    radius="2" />
</create>
<create symbol="#" block="wall">
    <part name="*" texture="images/grid.gif" />
</create>
<create symbol="Q" block="floor">
    <part name="top" texture="images/teleport.gif" />
    <exit REF="patent2.3dml#default" />
</create>
<create symbol="+" block="floor" >
    <part name="*" texture="images/grid.gif" />
</create>
<create symbol="f" block="floor">
    <part name="*" texture="images/grid.gif" />
</create>
<create symbol="E" block="E">
    <part name="*" texture="images/grid.gif" />
</create>
<create symbol="I" block="sprite">
    <part name="*" texture="images/in3d.gif" />
</create>
<create symbol="P" block="sprite">
    <part name="*" texture="images/cat89.gif" />
</create>
<create symbol="C" block="sprite">
    <part name="*" texture="images/car2.gif" />
</create>
<Player Block="P" />
<LEVEL NUMBER="1">
#########
###
###
###
###
###
###
###
###
###
</LEVEL>
<LEVEL NUMBER="2">
a.....+ +E#
......+ +Q+
b.....+ + + +
......+ + + +
c...C.....
..........
........#
.T.I....#
.......!#
.....#####
</LEVEL>
<LEVEL NUMBER="3">
.........f
..........
..........
..........
..........
..........
..........
..........
..........
..........
</LEVEL>
<ENTRANCE LOCATION="(10,1,3)" NAME="default" angle="180"/>
<EXIT LOCATION="(9,2,2)" REF="patent2.3dml#default" />
```

TABLE I-continued

```
</body>
</spot>
```

TABLE II

```
<spot>
<head>
<title>Patent Demo</title>
<style name="demo"/>
<map dimensions="(5,4,1)"/>
<ambient_light brightness="75%"/>
</head>
<body>
<create symbol="P" block="sprite">
        <part name="*" texture="images/cat89.gif" />
</create>
<create symbol="+" block="floor">
        <part name="*" texture="images/grid2.gif" />
</create>
<create symbol="L" block="floor">
        <part name="top" texture="images/teleport.gif" />
        <light brightness="100%" />
</create>
<Player Block="P" />
<LEVEL NUMBER="1">
+ +L+ +
+ + + + +
+ + + + +
+ + + + +
</LEVEL>
```

A change in the preferred embodiment from the syntax shown in Table I is that POPUP tags are placed toward the end of the code in Table I, outside of CREATE tags. This allows popup items to exist independently of block objects. The POPUP tag has a LOCATION parameter (similar to the ENTRANCE and EXIT tags) which specifies the location of the POPUP. The POPUP tag also specifies the type of popup—which can have a texture, text, sound file, etc. associated with it. Thus, the popup items can be specified with the following lines placed outside of <CREATE> tags as, for example, towards the end of the file after the <EXIT LOCATION> tag.

<popup location=(1,1,2) texture="images/face.gif" coords= "(400,50)"/>
<POPUP location=(1,3,2) SIZE="(100,100)" COLOR=" (255,255,255)" COORDS="(100,100)" BGCOLOR=" (30, 30, 30)" FGCOLOR="(0, 0, 0)" TEXT="Wink wink, nudge nudge, say no more . . ." />
<POPUP location=(1,5,2) texture="images/imagemap.gif" coords="(50,50)" radius="2" />

Central to the .3DML format is the use of a <create> tag which associates a single-character text symbol with a block name. Default symbols can be used. However, it makes for a more readable Spot file where each symbol is declared within the body of the Spot file prior to using the character in a symbolic map. The symbolic maps are defined between <LEVEL> tags. As shown in Table I, the Spot has three vertical levels, thus requiring three separate symbolic maps referenced as numbers 1, 2 and 3.

Much of the syntax of a Spot file will feel familiar to authors who are already familiar with HTML. However, the system of the present invention provides unique tags to allow the selection and position of objects in a 3-dimensional environment by using 2-dimensional symbolic maps. A definition of the syntax of the tags is given in Table III.

TABLE III

<SPOT>...</SPOT>
    The first and last tags in a 3DML file. Everything between these tags is considered to be a spot described in the .3DML format.
<HEAD>...</HEAD>
    These tags define a block of information which appears before the body section. The header acts as it does in HTML, containing the title and meta information for the spot description.
<BODY>...</BODY>
    These tags surround the body content of the spot description.
Tags that can appear in the header of the .3DML file
<TITLE>...</TITLE>
    The text between these tags is the name of the world, intended to be displayed by the browser somewhere, such as in the main window frame.
<META NAME="name" CONTENT="content"/>
    Meta information often used by search engines and host sites - for now our meta tags are ignored in the parser but can be read directly from the 3DML file by search engines - later we will store the content by name internally and make them available to JavaScript and Java. We will also define specific META information for 3DML spots that we can use to make better directories of sites that use this format.
<STYLE NAME="block-style url#version"/>
    Specifies which set of 3D blocks (i.e. textures, sounds, models and behaviors to use to display this spot in the browser. There is one set in the current software named "basic". When a style is referenced the application checks on the client machine for the given style files and checks if the version is at least as current as the version in the style tag. If the style is present, the blocks from that style are loaded into the application. The present version assumes that the style file is on the user's machine. A future version can determine if the style file is not present and download needed files from a given URL and store them on the client machine.
<MAP DIMENSIONS="(columns,rows,levels)"/>
    This tag specifies the dimensions of the 3D map described in this 3DML file in units of blocks (every block is the same size; imagine them as wooden cubes placed side by side and also stacked to create levels)
<SKY TEXTURE="image-file-path" BRIGHTNESS="brightness%"/>
    Uses the given image file (GIF or JPEG) as the tiled texure for the sky above the world. The image is rendered onto a sphere surrounding the world. The brightness parameter sets the light on the sky image between 0 and 100 percent (default is 100%).
<HORIZON TEXTURE="image-file-path" BRIGHTNESS="brightness%"/>
    Uses the given image as the tiled texture for the horizon at the distant edges of the spot. The horizon is moved in parallax to the rnote distant sky to give an illusion of motion to a player. At the time of this writing, this feature is not implemented in the current version.
<GROUND TEXTURE="image-file-path" BRIGHTNESS="brightness%"/>
    If supplied the browser uses the given image as the ground plane. An author can then build a map without having to supply a solid floor.
<AMBIENT_LIGHT BRIGHTNESS="brightness%"/>
    Set the ambient light level for the entire spot.
Default is 100% brightness.
<AMBIENT_SOUND FILE="wave-file-path" VOLUME="volume%"/>
    Uses the given WAV file as the ambient sound of the entire spot. The volume of the sound can be between 0 and 100 percent (default is 100%). Not yet implemented in current version.
<PRELOAD>..spot urls...</PRELOAD>
    If a list is given, preload these spots as the most likely next places this person will travel. The best use of this is to list the other spots on this web site that have doorways in the spot map contained in this file. This is a hint to the browser to download when and if it has extra cycles. There is no guarantee that the world will be ready when needed, this is just a hint. The user of the browser can turn off this feature. Not yet implemented in current version.
Tags that can appear in the body of the .3DML file
<IMAGEMAP NAME ="map-name">
    <AREA SHAPE="rect" COORDS="x1,y1,x2,y2" HREF="url"/>

TABLE III-continued

```
...
</IMAGEMAP>
        This sets up a named map of hot spots that is used
for imagemaps - an imagemap can be used when describing a
POPUP in the CREATE tag. Not yet implemented in current
version.
<CREATE SYMBOL="letter" BLOCK="letter-or-named-block-object">
        <PART NAME="name" TEXTURE="image-file-path"
                COLOR="(red,green,blue)"
STYLE="opaque|translucent"
                SCALE="factornumber" OFFSET="(x,y)"/>
        <LIGHT BRIGHTNESS="brightness%" RADIUS="blocks"/>
        <SOUND FILE="wave-file-path" VOLUME="volume%"
                RADIUS="blocks"
PLAYBACK="looped|random|continuous" />
        <POPUP TEXTURE="image-file-path" COORDS="(x,y)"
                RADIUS="blocks" IMAGEMAP="map-name"/>
        <TEXTPOPUP TEXT="ascii text" SIZE="(width, height)"
                COLOR="(r,g,b)" BGCOLOR="(r,g,b)"
FGCOLOR="(r,g,b)"
                ALIGN="left|right|center"
</CREATE>
        Every 3D block object is assigned a single printable
ASCII character as a symbol, for instance a Wall block is
assigned to the # character. So when you make a wall on the
map you might type ##### which is a wall that is five blocks
wide - every block is 256 pixels cubed. The CREATE tag allows
you to change the textures applied to a block object and
change some other features of block - for instance the
lighting, sound and hyperlinks assigned to a block. (See below
for a list of part names for each type of block.) POPUPS are
images that get displayed on the 2D screen when the user
travel within the radius defined this 2D image can be a
still image, an animated image or an imagemap.
<PLAYER BLOCK="letter-or-named-block-object"
CAMERA="(x,y,z)"/>
        Defines the biock that is to be used to represent
the player, with a camera automatically placed at a position
relative to the center of this block.
<LEVEL NUMBER="number" >...rows of building block
letters...</LEVEL>
        Defines the two dimensional map for one floor level
of a spot. Between the tags all letters are interpreted as
building blocks for rendering the spot. The map must be
written as a rectangle of characters with all rows equal in
length. There is a one to one correspondence between the
letter positions in the map and the placement of the 3D blocks
in the resulting spot. The level number indication is
optional. It is expected in general that each consecutive
LEVEL defines a new floor level of this spot.
<ENTRANCE LOCATION="(column,row,level)" NAME="name"
ANGLE="degrees"/>
        Where players can hyperlink into this spot from
another spot. More than one of these can be defined in a
single spot description. There must be at least one name
"default". Entrance can be set on block objects using the
CREATE tag and then place the block in the map or you can
write them in after a LEVEL description. The difference is
that using the ENTRANCE tag ties an entrance to a specific
numerical location on the map. Using the CREATE tag ties an
entrance to a specific block, so if you move the block later
or expand the map - the entrance moves too.
<EXIT LOCATION="(column,row,level)"
REF="filename#entrance-name"/>
        A hyperlink to another .3DML file. The reference
gives the filename or URL of the destination spot, with an
optional entrance name (if omitted the "default" entrance will
be used).
```

Block File Format

The .BLOCK file format is also an ASCII markup language similar to HTML. The .BLOCK format can be edited in a standard text editor and is used in conjunction with Spot (.3DML) files. The .BLOCK file defines individual objects that are used to create environments described by .3DML files.

A .BLOCK file contains the block type, 3D model descriptions, animation details, description of parts of an object and textures applied to facets or parts of a block as well as any scripts of actions that the object will perform at runtime.

Each .BLOCK file describes one individual object. A .STYLE file (described below) associates a set of individual blocks to names and symbols used in a .3DML file. This can be thought of as creating a 3D "font" of objects for use in the Spot file. The Spot file then can use these symbols to describe a symbolic map laying out a 3D or isometric (in the case of tiled 2D graphics) environment using the symbols that represent BLOCK objects.

Table IV shows an example of .BLOCK file. The tags in the .BLOCK file are described in Table V.

TABLE IV

```
<!- -East ramp block. - - >
<block name="east ramp">
    <vertices>
        <vertex ref=" 1" Coords="(  0,32,256)"/>
        <vertex ref=" 2" coords="(256,288,256)"/>
        <vertex ref=" 3" coords="(256,288,  0)"/>
        <vertex ref=" 4" coords="(  0, 32,  0)"/>
        <vertex ref=" 5" coords="(  0,  0,256)"/>
        <vertex ref=" 6" coords="(256,  0,256) />
        <vertex ref=" 7" coords="(256,  0,  0)"/>
        <vertex ref=" 8" coords="(  0,  0,  0)"/>
        <vertex ref=" 9" coords="(256,256,256)"/>
        <vertex ref="10" coords="(256,256,  0)"/>
    </vertices>
    <parts>
        <part name="bottom" texture="pavement.gif">
            <polygon ref="1" vertices=" 5, 8, 7, 6"/>
        </part>
        <part name="ramp" texture="pavement.gif">
            <polygon ref="2" vertices=" 2, 3, 4, 1"/>
            </part>
            <part name="edges" texture="brick.gif">
            <polygon ref="3" vertices=" 2, 1, 5, 6"/>
            <polygon ref="4" vertices=" 3, 2, 9,10"/>
            <polygon ref="5" vertices="10, 9, 6, 7"/>
            <polygon ref="6" vertices=" 4, 3, 7, 8"/>
            <polygon ref="7" vertices=" 1, 4, 8, 5"/>
        </part>
        <sound name="noise" file="wind.wav" radius="4"/>
        <light name="spot" brightness="30%" radius="5"/>
    </parts>
</block>
<!- - Tree block. - -->
<block name="tree" >
    <vertices>
        <vertex ref=" 1" coords="(   0.00000,  32.00000, 256.00000)"/>
        <vertex ref=" 2" coords="( 256.00000,  32.00000, 256.00000)"/>
        <vertex ref=" 3" coords="(   0.00000,  32.00000,   0.00000)"/>
        <vertex ref=" 4" coords="( 256.00000,  32.00000,   0.00000)"/>
        <vertex ref=" 5" coords="( 166.48531,  32.00000, 166.48529)"/>
        <vertex ref=" 6" coords="( 136.61875,  32.00000, 166.48529)"/>
        <vertex ref=" 7" coords="( 166.48531,  32.00000, 136.61863)"/>
        <vertex ref=" 8" coords="( 159.01875,  89.60000, 159.01857)"/>
        <vertex ref=" 9" coords="( 159.01875,  89.60004, 144.08523)"/>
        <vertex ref="10" coords="( 144.08531,  89.60004, 159.01857)"/>
        <vertex ref="11" coords="(   0.00000,   0.00004, 256.00000)"/>
        <vertex ref="12" coords="( 256.00000,   0.00004, 256.00000)"/>
        <vertex ref="13" coords="(   0.00000,   0.00000,   0.00000)"/>
        <vertex ref="14" coords="( 256.00000,   0.00000,   0.00000)"/>
        <vertex ref="15" coords="( 241.60609,  89.60000, 241.60595)"/>
        <vertex ref="16" coords="(  27.45781,  89.60001, 184.22512)"/>
        <vertex ref="17" coords="( 184.22531,  89.60001,  27.45787)"/>
        <vertex ref="18" coords="( 252.91969, 145.06667, 252.91961)"/>
```

TABLE IV-continued

```
        <vertex ref="19" coords="(   3.08016, 145.06668, 185.97528)"/>
        <vertex ref="20" coords="( 185.97547, 145.06667,   3.08023)"/>
        <vertex ref="21" coords="( 241.60609, 200.53335, 241.60595)"/>
        <vertex ref="22" coords="(  27.45781, 200.53335, 184.22512)"/>
        <vertex ref="23" coords="( 184.22531, 200.53333,  27.45787)"/>
        <vertex ref="24" coords="( 207.66500, 256.00000, 207.66480)"/>
        <vertex ref="25" coords="( 100.59078, 256.00000, 178.97442)"/>
        <vertex ref="26" coords="( 178.97453, 255.99998, 100.59080)"/>
    </vertices>
    <parts>
        <part name="leaves" texture="leaves.gif" style="scaled">
            <polygon ref=" 1" vertices="23,22,25,26"/>
            <polygon ref=" 2" vertices="26,24,21,23"/>
            <polygon ref=" 3" vertices="20,19,22,23"/>
            <polygon ref=" 4" vertices="23,21,18,20"/>
            <polygon ref=" 5" vertices="19,20,17,16"/>
            <polygon ref=" 6" vertices="20,18,15,17"/>
            <polygon ref=" 7" vertices="24,25,22,21"/>
            <polygon ref=" 8" vertices="21,22,19,18"/>
            <polygon ref=" 9" vertices="18,19,16,15"/>
            <polygon ref="10" vertices="24,26,25"/>
            <polygon ref="11" vertices="10,15,16,17,15"/>
        </part>
        <part name="trunk" texture="trunk.gif">
            <polygon ref="12" vertices=" 7, 6,10, 9"/>
            <polygon ref="13" vertices=" 5, 7, 9, 8"/>
            <polygon ref="14" vertices=" 6, 5, 8,10"/>
        </part>
        <part name="floor" texture="bag.gif">
            <polygon ref="15" vertices=" 2, 4, 3, 1"/>
            <polygon ref="16" vertices="13,11, 1, 3"/>
            <polygon ref="17" vertices=" 2, 1,11,12"/>
            <polygon ref="18" vertices=" 3, 4,14,13"/>
            <polygon ref="19" vertices=" 4, 2,12,14"/>
            <polygon ref="20" vertices="14,12,11,13"/>
        </part>
    </parts>
    <BSP_tree polygons=" 1,20, 2,19, 7,18,10,17,11, 9, 3, 8, 4, 6, 5, 0, 0, 0, 0, 0, 0, 0,16,15, 0,14,12,13, 0, 0, 0, 0, 0, 0, 0, 0, 0, 0, 0, 0"/>
    <sound file="bird.wav" radius="3.0" playback="random"/>
</block>
```

TABLE V

```
<BLOCK NAME="block_name" TYPE="block_type">
    ...any of the following tags can be placed inside the block tag
    <VERTICES>...</VERTICES>
    <PARTS>...</PARTS>
</BLOCK>
    This sets up a new block with the given name - the
    style file can use this given name or override it. The block
    type refers to an object class built into the In3D Player
    (e.g. sprite, structural block or moving block)
    <VERTICES>
    <VERTEX REF="#" COORDS="( x,y,z)"/>
    ...
</VERTICES>
    Defines the coordinates, local to the block, of the
    points that will be used to draw polygons in three space. The
    polygons are defined inside the PARTS tag under each part
    name.
<PARTS>
    <PART NAME="name" TEXTURE="image-file">
        <POLYGON REF="1"VERTICES=" #,#,#,#..."/>
```

TABLE V-continued

```
    ...
    </PART>
        <SOUND NAME="name" FILE="url or file" RADIUS="#"
            PLAYBACK="random|continuous|state"/>
        <LIGHT NAME="name" BRIGHTNESS="#%" RADIUS="#"/>
    ...
</PARTS>
        The parts define the named pieces of an In3D Block -
some parts describe polygon shapes, others describe sounds and
lights that are attached to the block. These named parts are
then exposed to authors in the 3DML file to customize the
textures and sounds attached to blocks.
<BSP_TREE POLYGONS="polygon_pairs,... "/>
        Defines the bsp tree data for the models included in
this block. BSP trees determine which polygons are hidden or
can be seen based on the angle of view.
```

TABLE VI

```
A .STYLE format describes sets of block objects for
use in a Spot file. The text for a style file is shown in
Table VI.
<!- - Demo style file. - ->
<style>
    <block symbol="+" name="floor"        file="Floor.block"/>
    <block symbol="*" name="halfwall"
file="Halfblock.block"/>
    <block symbol="#" name="wall"
file="Fullblock.block"/>
    <block symbol="N" name="northramp"
file="NorthRamp.block"
    <block symbol="S" name="southramp"
file="SouthRamp.block"
    <block symbol="E" name="eastramp"
file="EastRamp.block"/>
    <block symbol="W" name="westramp"
file="WestRamp.block"/>
    <block symbol="~" name="water"        file="Water.block"/>
    <block symbol="x" name="entrance"
file="Entrance.block"/>
    <block symbol="T" name="tree"         file="Tree.block"/>
    <block symbol="P" name="sprite"       file="Sprite.block"/>
    <block symbol="!" name="floodlight"   file="Light.block"/>
</style>
```

The tag for establishing references to a particular block (each block file is a single object, or block), is the <BLOCK SYMBOL> which has the form <BLOCK SYMBOL= "'ascii_character'" NAME="'name'" FILE="'url or file name or style.blocknamee'"/>. The <BLOCK SYMBOL> tag sets up a new block with the given letter of reference and name.

An example of associating blocks with symbols by using a Style file is shown in Table I where the .3DML source shows that the "demo" style file is to be used for the Spot as indicated by the fourth line which uses the <style> tag. The "demo" style file is assumed to reside in the default style directory (typically the /style subdirectory off of the working directory) with the name "demo.style".

The demo.style file, in turn, has the .STYLE format text shown in Table VI which refers to 12 block files named Floor.Block, Halfblock.Block, Fullblock. Block, . . . Light- .Block. Each block is associated with a shorthand block name such as "floor," "half wall," "wall," . . . "flood light," respectively. Each file name and shorthand name is associated with a symbol such as "+," "@," "#," . . . "!," respectively.

Note that, for example, the "+" is defined using a <create> tag in the .3DML source of Table I. Although the "+" is defined with a default shorthand name and associated block file name in the style file of Table IV, the symbols can be redefined, or given a different association, within the Spot file. In the example of .3DML source of Table I, the symbol "+" is maintained associated with the block with shorthand name "floor" (so that the block file name "Floor.block" is still used). However, all of the parts of the floor object are given the texture in the file "images/grid.gif".

An example of re-assigning a block to a different symbol can be shown by referring to the <create symbol="a" block equals "tree"> tag that is the first <create symbol> definition in the Spot file. Even though Table VI shows the demo.style file as associating the symbol "T" with the tree block, the Spot author may assign additional symbols with the same tree block. A difference here, is that the Spot author has associated a popup texture, "images/face.gif," with the tree represented by the symbol "a". The ability to assign blocks, or objects with different properties, such as a different popup item, to different symbols provides a Spot author with flexibility in creating, organizing and documenting symbolic maps used in the Spot files.

The assignment of a tree block to the symbol "a" does not override the previous association of the tree block with the "T" symbol. The tree block is also used in the definition of symbols "b" and "c" of the .3DML source of Table I. The symbol "b" is used to represent a tree object with a popup text sprite and attributes such as size and color as shown in the <create symbol> tag of Table I. Similarly, the symbol "c" is used to define a popup imagemap. The appearance of these popup objects is shown, as discussed above, in connection with the screen shots of FIGS. 4A–S.

The block files can be organized into different "libraries" of objects that can be used in the creation of different Spots. Because the objects can act as building blocks, it is possible to make large structures from the relatively small blocks. In the preferred embodiment, each block takes up roughly a 256×256×256 space in the 3-dimensional environment. As described, the 3-dimensional environment layout imitates the grid-like layout of the symbolic map in the Spot files.

A block often includes one use for block libraries is to provide a different "look" for a particular Spot or a group of Spots. That is, a set of blocks, or blocksets can be designed to portray a medieval setting by having gray stone texture maps, crenellated tops for walls, thatched roofs for cottages, grass texture maps for terrain, etc. Another blockset can be used to create a modern-day cityscape by having blocks with models of steel, concrete and glass structure portions, objects such as mailboxes, stop lights, etc. Appropriate textures and sound effects are provided with appropriate media files included with the blocksets. The blocksets can be provided on a CD-ROM, downloaded from the Internet, or by other means. In the preferred embodiment, it is desired that the blockset resides locally with the user's system so that access and execution speed will be fast.

A feature of the present invention is that a banner block stretches to match the size of the image file attached to it.

Blocks can have interactive behavior, as where a block moves around in the 3-dimensional environment in real time. This is useful, for example, to show an object such as a "blimp" that may be defined as a single block object with a scripting language that specifies how the blimp block moves. Other animations for blocks can be readily envisioned such as rotating blocks, blocks that fade in or out, blocks that explode or exhibit other particle-like behavior, etc.

Another use for blocks is that just to have different block sets of varying resolution for selection according to the performance of the user's PC. For example, a low-medium and high polygon versions of a blockset can be provided for the user. The performance manager process of the present invention, discussed above in connection with FIG. 1, can select the appropriate blockset depending on the detected performance of the user's computer. Examples of basic block types that are provided in a basic block in the preferred embodiment is described in Table VII.

TABLE VII

Structural Blocks
The structural block type is built into the application as a block which is used in combination with other blocks to make larger structures such as building, bridges, arches or roads.
wall "#"
    A solid cube object 256 × 256 × 256 pixels. PARTS: n, s, e, w, top, bottom
short_wall ";"
    A wall that is 256 × 256 × 128. PARTS: n, s, e, w, top, bottom
floor_block "+"
    A 256 × 256 × 32 block that is used to create a flat surface to walk on. PARTS: n, s, e, w, top, bottom
floor_tile "_"
    A flat surface that can also be walked on but which is more useful when one wants to wallpaper with a floor area with a transparent texture. PARTS: top
empty "."
    A completely empty cube - just air - useful as filler in a level map.
north_ramp "n"
south_ramp "s"
east_ramp "e"
west_ramp "w"
    Smart ramps are 45 degree wedges that can be walked up or down by the user. When more than one ramp is placed side by side in the same level they merge and create a new ramp across two or more blocks, changing the angle of the merged top to go from the floor or the starting ramp to the top of the ending ramp - in this way you can connect 2,3,4 or more blocks and create a smooth ramp. PARTS sides,top,bottom
tree "t"
    A tree model that is useful for landscaping outdoor scenes and for the user to climb.
corners "\" "/"
    A corner block is a standing wall that crosses the diagonal of a block. It is useful for creating 45 degree angles in the corner of walls. There are two corners to cover both diagonals of a cube. PARTS sides,top,bottom
Ambient Blocks
The ambient type describes atmospheric effects that are not usually solid objects but instead effect the quality of light, sound or air in an area of the 3D environment.
light "!"
    A flood light shining in all directions - no 3D model.
spotlight """
    A spot light shining in a certain direction and brightness - might have a 3D model or a street lamp or theater spotlight.
sound "<"
    No 3D model but this block holds a sound that you can place anywhere a map.
fog "f"
    No 3D model but this block holds a misty fog effect that you can place anywhere a map.
water "~"
    A water block that acts as a bounded area of water - many can be placed side by side to create streams, rivers, waterfalls or lakes. The water is not solid and the user can jump into the water and go under.
Transit Blocks
    This type is built into the application to describe blocks that move users (characters) from one place to another, either through physics or through hyperlinking.
link = "@"
    A hyperlink block object that takes you to a new 3DML or HTML page.
elevator "^"
    This object can be stepped onto by a player and it then moves the player to another point on the map slowly. An TABLE VII-continued elevator can either move horizontally or vertically depending on how it is placed. To set up an elevator an author places two elevator blocks in the map to match the end points of where the elevator will travel. The end points must be in a straight line from each other. If the elevator blocks are placed vertically the elevator moves up and down, otherwise it moves horizontally.
door "d"
    A sliding door that opens when it is bumped into - unless a switch has turned it off.
Sign Blocks
    The sign type displays user information and can be interacted with to display further information. The author of the 3D environment determines the layout of the graphics or text to be displayed.
banner "B"
    This block takes a GIF or GIF89 (e.g. an ad banner) and wraps a 3D sign model around it. In this case the image is allowed to exceed the 256 pixel length limit because most as banners are longer. The banner then rotates in 360 degrees like the old gas station signs. A player can press the sign to link to go to the banners URL if there is one.
sprite "*"
    Unfolds a GIF89 into individual frames. It then displays the appropriate frame depending on what angle the player is standing in relation to the sprite. In this way one could display an object that looks 3D by providing X number of frames of the object shot at the correct angles. For instance, one could photograph a car from every 60 degrees and produce a GIF89 with 6 images that could we walked around in a Spot.
blimp "b"
    A sign object that is a single polygon "thick" and placed vertically. Once the spot is displayed this block has an internal program that travels randomly around the level in which it was placed. How this program works - does it loosely follow a player and/or does it travel in straight lines and only change direction when it hits a wall - ala pong. If the player is lucky enough to catch the blimp then there can be a URL attached to it.
Input Blocks
The input type requests information from the user, either a selection, a setting or the typing in of textual information.
typeinfield "="
    A type in area where text is displayed as the user types in - similar to a form field in HTML.
choice "?"
    Plays a GIF89 back frame by frame. The player can press the choice block to select one of the images.
switch "%"
    This is a light switch - if a player hits the switch, any light, sound or door block within X blocks (radius) of the switch is toggled on or off.

D. Viewer Processing

Figure 5:
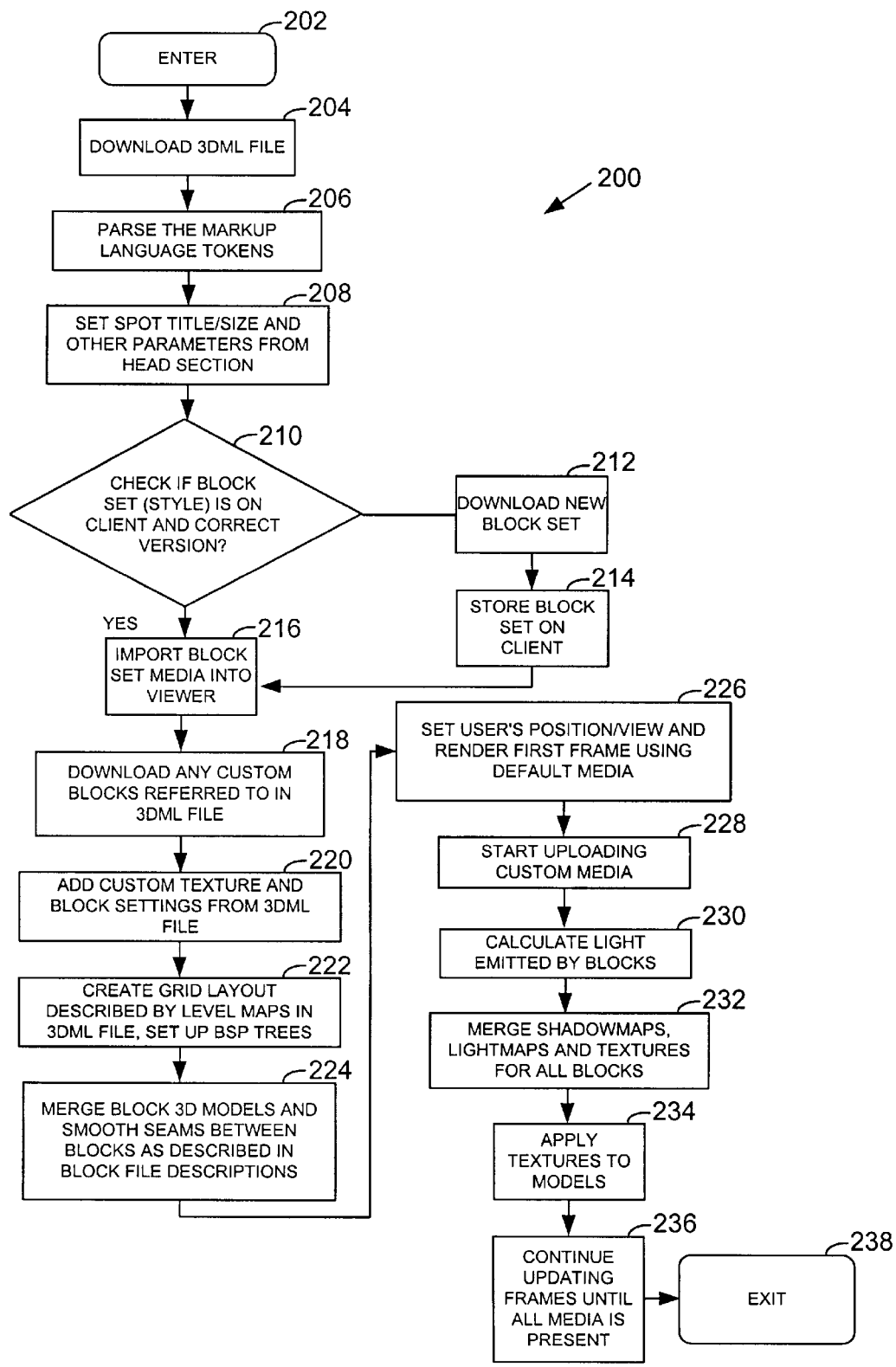
FIG. 5 is a flowchart of a parsing process.

The viewer program, or process, accepts Spot Files, Block Files (including Style Files) and Media Files as input. The viewer generates a display of the 3-Dimensional environment according to the input information. Various processes in the overall viewer program were shown above in connection with FIG. 1. This section discusses parsing, rendering and viewing processes in detail in connection with the flowcharts of FIGS. 5, 6 and 7, respectfully. FIG. 5 shows flowchart 200, illustrating some basic steps in the parsing process of the viewer program of the present invention.

In the Flowchart 200, shown in FIG. 5, as with all flowcharts in this specification, basic steps are loosely organized into a logical flow diagram. The flowchart is but one way of representing the steps in the process in a diagram format. Other formats are possible.

For example, it may be possible to perform a parsing process using more, or fewer, steps than are shown in Flowchart 200. Although the process spoken of is a single process, or routine, executing in a computer system, it should be apparent that multiple processes can be used. Also, the process steps can be implemented by any means known in the art. That is, procedural, object oriented, artificial intelligence, etc. programming techniques can be used to implement the process steps.

The process may operate in a multi-threaded environment, in a parallel processing environment, etc. The process can be implemented in any suitable computer language under any suitable operating system and on any suitable computer hardware platform. The flowchart is only a general description of steps taken place in a process of present invention. The actual source code, contained in the Source Code Appendix attached hereto, should be consulted for specific details of the actual preferred embodiment of the invention.

Returning to FIG. 5, Flowchart 200, which performs the parsing process of the present invention, that of accessing, reading and interpreting tags and symbols within the input files, is entered at Step 202.

At Step 204, it is assumed that a 3DML File, or Spot File, is requested. Such a request can be made, for example, when a user is browsing the Internet and is linked to a Spot File. Other ways for a Spot File to be accessed is explicitly by the user, as where the user types in a URL, that is the location of a Spot File. When the Spot File is requested, the viewer, or browser running the viewer, sends a request over the network to download the 3DML File. Typically this would be a download over the Internet. However, it is possible that the Spot File, and other files, are already present locally to the user's computer system. Another possibility is that the user is accessing the Spot File over an Intranet, or from some other source. The step of downloading the 3DML File results in a copy of the 3DML File in the user's computer system.

Next, Step 206 is executed to parse the mark-up language tokens within the Spot File. This is a top-down execution and interpretation of the various tags in accordance with Tables I–VII discussed above. Depending on the presence of tags, certain actions will be taken as discussed with connection those tags.

Some basic processing that will usually be present in a Spot File is to set default, global parameters and attributes such as the ambient light brightness, spot size or dimensions, selection of a style file, etc.

At Step 210, a test is made to check whether a block set that may be requested by a style file is already present at the user's local computer. Also, the version number can be specified along with the block set name. If the correct and updated block set is not present, execution flows to Step 212, where the correct block set is downloaded onto the user's computer. Step 214 indicates that the block set is stored on the client computer system, typically on a disc drive.

After executing step 214, or if the test at Step 210 determines that the correct block set is already present on the user's machine, execution flows to step 216, where the media files required by the block set are imported into the viewer. The means of playing back media information, such as .GIF images or .WAV sounds can be, with built in programs in the viewer, or with plug-in modules in the viewer or in a browser. That is, the media information can be played back by programs and processes external to the viewer of the present invention. Step 216 merely indicates that the information is made ready to be quickly accessed and executed by whatever program or process is going to perform to play that function.

Next, Step 218 is executed to determine whether any custom blocks are required in the 3DML File. If so, they are downloaded. As discussed above, the <create> tag is used to associate symbols with Block Names and Block File Names. If, at Step 218, a <create> tag is used to associate a symbol with a Block File Name which is not resident on the user's machine, Step 218 serves to locate and download the custom block from the Internet, Intranet, etc.

Step 220 is next executed to add custom textures, images and block settings, if any, to the objects defined by the Block Files.

Next, Step 222 is executed to create the 3-dimensional environment positioning of objects analogous to the grid layout described by the level maps in the 3DML File. Also, binary space partitioning (BSP) trees are set up in the system RAM of the users's computer for fast aspect. The BSP trees are used to improve the efficiency of rendering the 3-dimensional scenes as well as speeding up collision detection, as discussed below.

Next, Step 224 is executed to merge blocks, if necessary. Merging of blocks is discussed in more detail below.

Next, Step 226 is executed to set the user's position and view and to render a first frame using the default media to generate an image on the user's computer display.

At Step 228, downloading of any necessary custom media begins. Since the display does not wait for downloading of the custom media but begins rendering using the default media, this provides the advantage of not making the user wait for potentially long downloading times. Although the user will not see the 3-dimensional scene rendered as desired by the spot author until all of the custom media has been downloaded, the user will have an approximation of the scene based on the default media. Also, it is probable that much of the custom media will not be used in an initial display of the scene or in the first few moments of displaying the scene. Thus, the act of rendering the scene without having all of the custom media is not a significant detraction from the spot author's intended rendering.

At Step 230, code is executed so that the light sourcing and shadowing effects are correctly displayed. At Step 232, the shadow maps, light maps and textures for all blocks are merged. This is done on the fly as the polygon is rendered. In other words, a composite texture map is formed from the original texture map and any light sources and shadows falling on the particular polygon. The information is merged and displayed on the polygon model. At Step 234, the textures are applied to the models. That is, as a texture, spright, image map, etc. is downloaded from the Internet. Each item can be applied to the rendering of the scene without waiting for additional items.

At Step 236, it is assumed that all of the media is present so that full rendering of the 3-dimensional environment from any viewing position that the user might select is possible. At this point, execution of the parsing process exits at Step 238. So that the viewing process can be initiated thus allowing the user to move about in a 3-dimensional environment.

Figure 6:
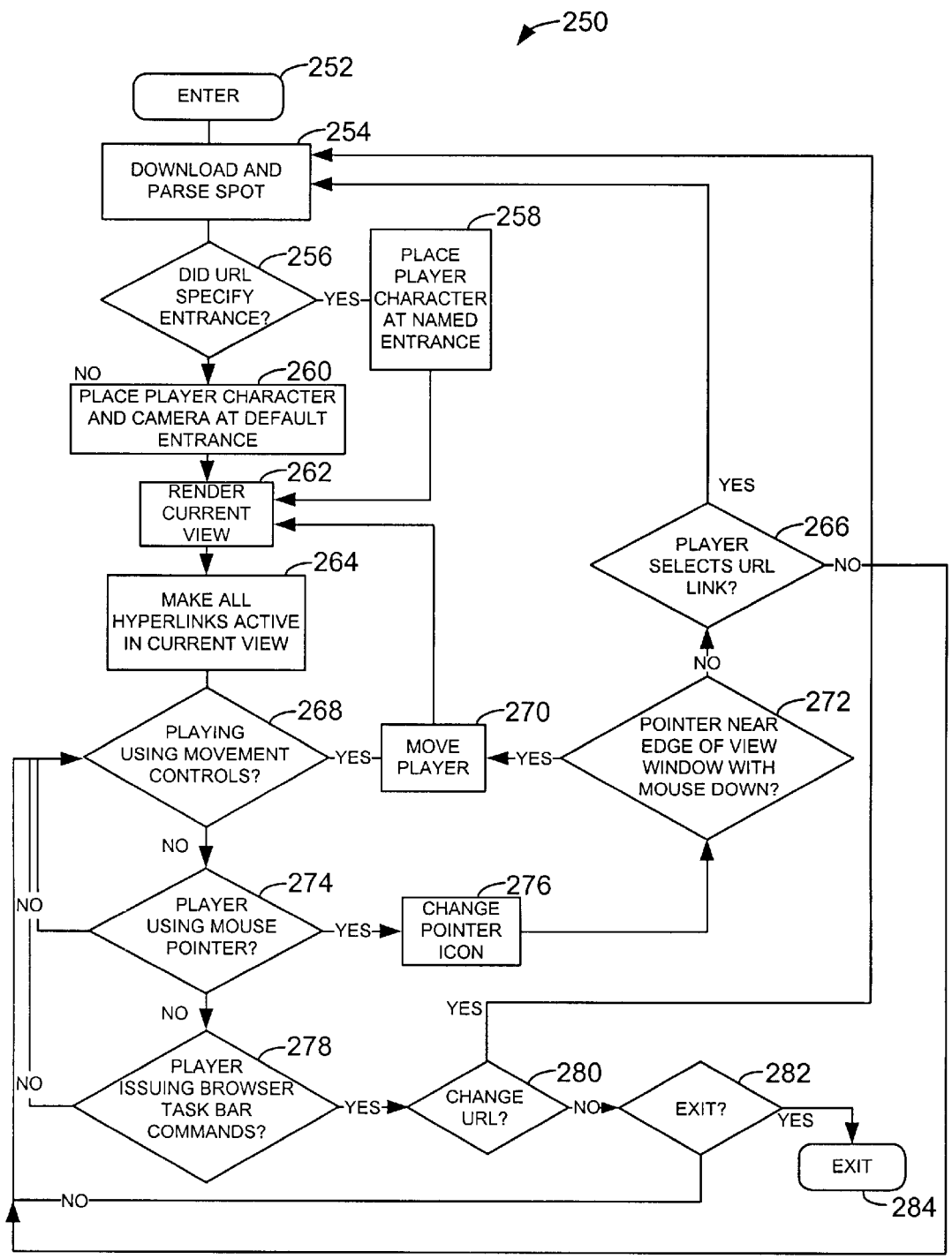
FIG. 6 is a flowchart of a user input process.

FIG. 6 shows Flowchart 250, describing the basic steps in the user input process of the present invention. The user input process receives signals from user input devices and acts to perform user-requested actions such as moving the user's viewpoint, jumping to different URLs through hyperlinks.

The user input process of Flowchart 250 is entered at Step 252.

At Step 254, a Spot File is downloaded and parsed. This invokes the parsing process discussed above in connection with FIG. 5. Once the parsing is complete, a test is made at Step 256 as to whether an entrance position is specified in the URL. The Spot file can specify several starting locations. The specific starting location to use is specified in the URL. This allows a user to arrive at different locations (e.g., one of two doorways) in a Spot via different paths, or hyperlinks, from other Spots. Such a mechanism is useful to simulate a larger environment, as where multiple Spots at different Web sites link to each other.

If a starting entrance location is specified, Step 258 is executed to place the player, character or spright (i.e. viewpoint) at the entrance location. If no entrance location is specified, Step 260 is executed to place the player at a default position and viewing direction. After either of Steps 258 or 260 is performed, Step 262 is preformed to render a current view.

Note that, in the preferred embodiment, view rending and user input processing are occurring in a simultaneous fashion. That is, the user input commands may be processed in a poled or an interrupt scheme so that rendering is taking the bulk of the computer processor's time. Any of a variety of techniques for handling seemingly concurrent user input processing and rendering are possible such as multithreading, time sharing, etc. The rendering process is discussed in detail below in connection with FIG. 7.

After review has been rendered, Step 264 is executed to make all visible hyperlinks active. I.e., the pointer will change to a finger pointer icon when moved over any of the hyperlinks.

Next, a check is made at Step 268 as to whether the player is using movement controls. Typical movement controls are the keyboard arrow keys. However, provision is also made to using the mouse as a movement control. Other user input devices can be used such as other keys on the keyboard, a trackball or other pointing device, etc. The checks at Steps 268, 274 and 278 act to accept user input using mouse and keyboard. Step 274 detects whether the player is using the mouse as a pointing device, i.e. to select a hyperlink, portion of an image map, etc. Step 278 detects whether the player is issuing browser task bar commands such as to reload a page, preform a text search of text in the scene, etc. If the player is not issuing any commands or using any input devices, the loop of Steps 268, 274 and 278 are repeated. When the player inputs a movement command, Step 270 is executed to move the player to a new position and viewing direction, as needed. The new viewing location and direction is used to render an updated view at Step 262. Any new hyperlinks resulting from the new view are activated at Step 264. The user input polling loop is then entered again.

Assuming the player is using the mouse pointer, the preferred embodiment assigns one of two actions to player's action. One use of the mouse pointer is to select a URL to which to jump. Another use is to let the player change the line-of-sight direction, as in "looking around," without moving translationally. At Step 276, the pointer icon is changed depending on which of these actions a player is performing. If the player has moved the mouse pointer over an active hyperlink area on the screen, the mouse pointer is changed to a "finger pointing" icon as is standard. If the player has moved the pointer to the extreme left or right edges of the screen, the pointer icon is changed to an arrow facing left or right and the field of view is rotated appropriately. Step 272 of checking whether the mouse is near the edge of view with the button down indicates the action of rotating the player's field of view. If so, Step 270 is executed to move the player accordingly, that is, change their line of sight. If not, a check is made to see whether the player is selecting a URL. If so, execution proceeds Step 254, where the user jumps to a new spot location. Note that the preferred embodiment allows a user to jump to any hyperlinkable document, such as a standard 2-dimensional text-web page. The destination need not necessarily be a 3-dimensional spot according to the present invention. If the user has not selected a hyperlink, execution returns to the polling loop to detect further user input commands.

Returning to the polling loop, at Step 278, if it is detected that the user is issuing task bar commands, or other commands, as where a browser application is executing the viewer of the present invention, execution proceeds to Step 280. At Step 280, a check is made to see whether the user's command is to change the URL. If so, execution proceeds to Step 254, where the new spot location is loaded. Again, this assumes that the URL corresponds to a new spot location. If, however, at Step 280, the user's command is not to change the URL, a check is made at Step 282 as to whether the command is an instruction to exit the 3-dimensional viewer. If so, the routine of FIG. 6 exits at Step 284. Otherwise, execution returns to the polling loop. Any task bar commands that need to be processed by the browser are either intercepted by, or are passed along to, the host browser.

Figure 7:
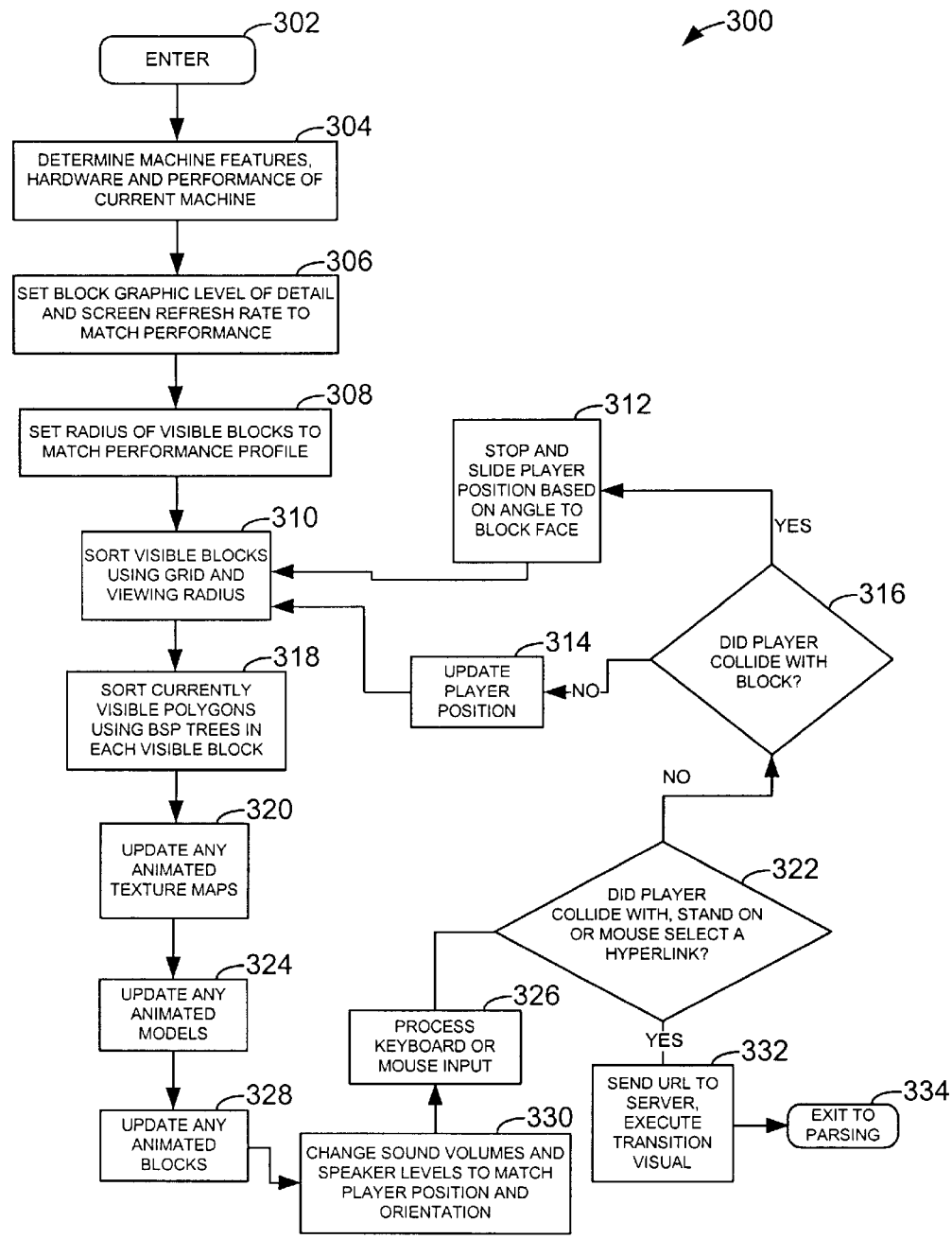
FIG. 7 is a flowchart of a rendering process.

FIG. 7 shows flowchart 300 illustrating the rendering process of the present invention.

In FIG. 7, the flowchart is entered at step 302. Steps 304, 306 and 308 are typically performed at startup time when, for example, the viewer is first launched. These steps operate in connection with the performance manager which sets the level of detail according to performance information on the speed and resources of the user's machine—the machine executing the viewer. As shown, step 304 determines the performance of the user's machine. Step 306 selects a blockset based on the level of detail (typically the average number of polygons allowed in a block object) that the user's machine can support. Step 308 sets the radius (i.e., depth) of blocks to render.

Step 310 is the first step in a rendering loop that is constantly executed to generate frames of the display in rapid succession to create the smooth first-person 3-dimensional perspective view. At step 310, the visible blocks are sorted to the pre-determined depth of step 308. Next step 318 is executed to sort the polygons in the visible blocks (or, grid locations) using the BSP trees that are defined in the .BLOCK files. At this point a frame can be generated for display. Typically, frame display is done by double-buffering the output so that the actual displaying of frames is asynchronous with respect to the rendering function. This is done for each object in a visible grid location. Step 320 is next performed to update any animated texture maps. Similarly, step 328 updates any animated blocks.

Next, step 330 adjusts sound volumes so that sounds emanating from positions nearer to the user's point-of-view sound louder. Step 326 processes user input from keyboard or mouse. A check is made at step 322 to determine whether the player/user has met with an object that is a hyperlink. If so, step 332 is executed to obtain the file associated with the URL that corresponds with the hyperlink. Step 334 is executed to obtain the Spot according to flowchart 200 of FIG. 5, already discussed. The hyperlinked Spot then becomes the new definition for generating the three-dimensional environment.

Assuming that the user does not meet with, or select, a hyperlink at step 322, a test is made at step 316 to determine whether the player collides with a block object. If so, step 312 is executed to simulate a collision. That is, the player's sprite slides along the face of the object. Naturally, other actions could occur, such as the player knocking down the object, bouncing off the object, etc. Execution proceeds to step 310 where the loop of rendering a frame, processing player movement and actions, detecting collisions, etc., repeats. If no collision is detected at step 316, step 314 is executed to update the player position. That is, the player is moved along the direction indicated by processing mouse or keyboard input.

Thus, the routines of flowcharts 200, 250 and 300 illustrate the parsing, user input and rendering processes, respectively. Although these processes have been having steps occuring in a linear fashion, they can be executed concurrently with each other, assuming there is a multi-processor environment. They can execute in a conceptually concurrent manner as in a multi-threaded operating system environment. Typically there will be hardware assistance for some of the rendering and display functions that is not presented in the flowcharts. Many deviations in real-world implementations of the steps shown in the flowcharts will be necessary depending on the specific computer platform that the viewer is executing upon. Thus, the depiction of processes as distinct flowcharts is only for illustrative purposes.

E. Additional Features

As previously mentioned, a feature of the present invention is that block objects can be placed adjacent to one another to form larger objects. For example, a ramp object and a cube object are shown placed adjacent to each other in the screenshot of FIG. 4D. This produces a ramp leading to a platform, perceived as a single object.

Figure 8A:
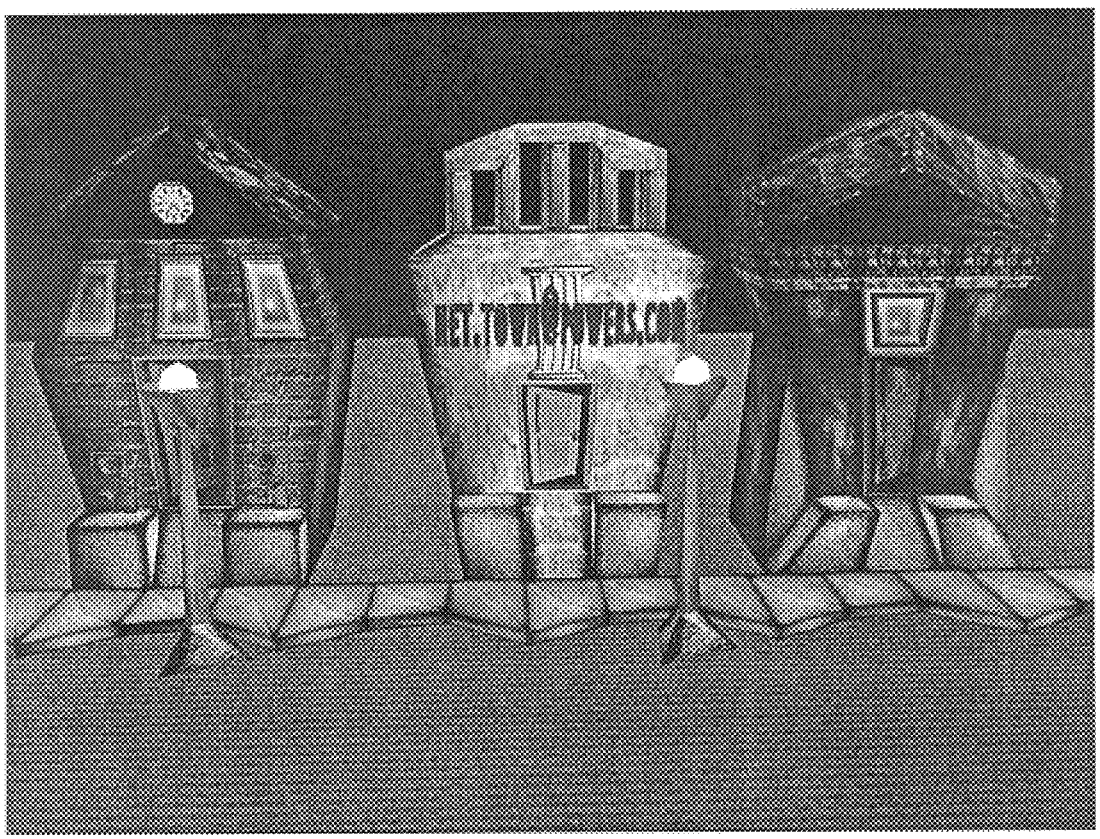
FIG. 8A is a first screenshot of a multi-level three-dimensional environment.
Figure 8B:
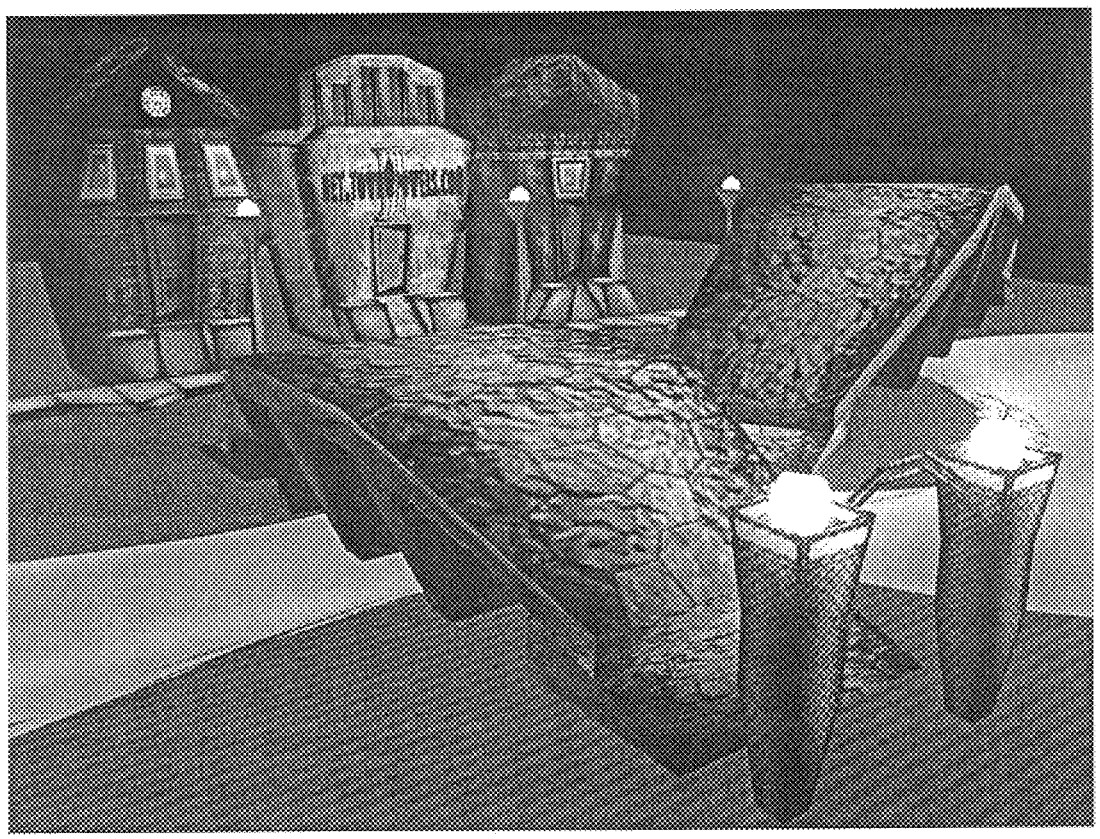
FIG. 8B is a second screenshot of a multi-level three-dimensional environment.

More impressive structures can be created, especially where blocksets are designed to have compatible-type building blocks, or "themes." An example of a more complex environment is shown in FIG. 8A, where three houses on a street across a bridge is shown. The entire scene is created with three simple symbolic maps, much like the three maps shown in FIGS. 3A–C. FIG. 8B shows a closer view of the house structures. The three levels (three maps) used form the ground level, ground tier and second tier of the environment. These can be imagined by noting that the terrain is the ground level. The sidewalk, water, bridge bases, lightposts, and first floor of the houses are all in the ground tier that is a second level over the ground level. The second stories of the houses are a third level, as are the topmost portions of one of the bridges shown in FIG. 8A.

Figure 8C:
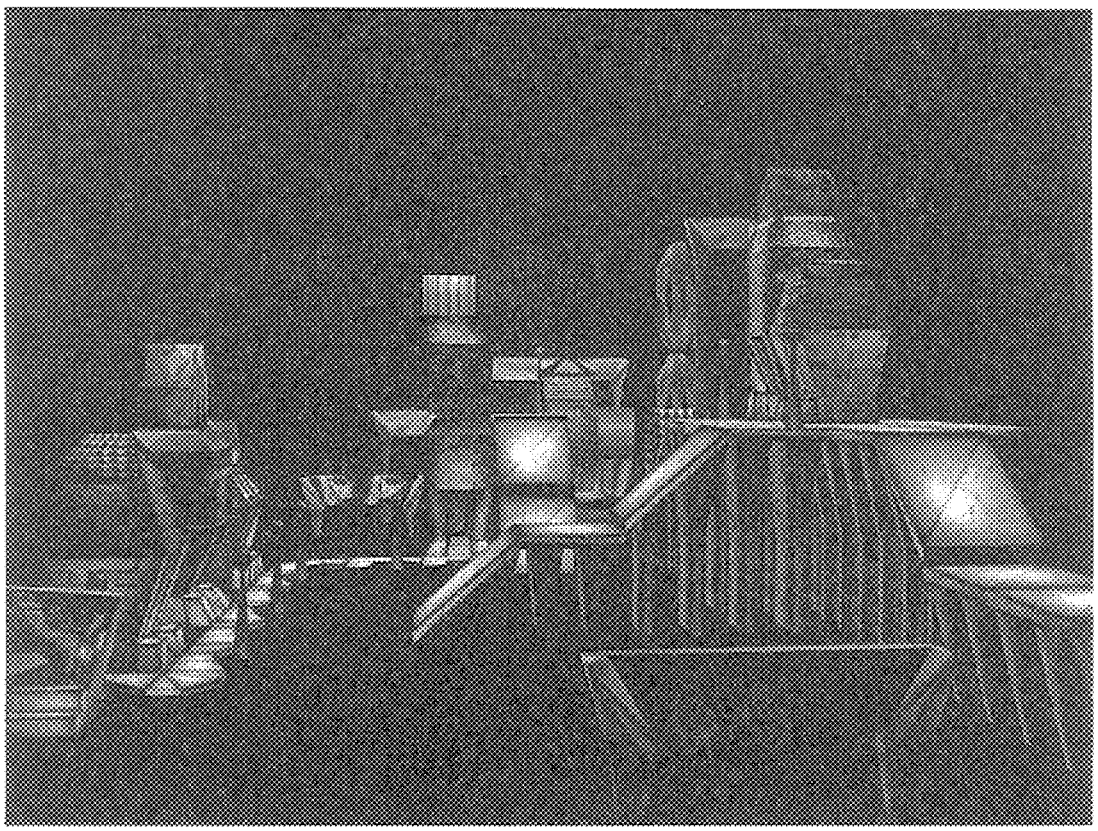
FIG. 8C is a third screenshot of a multi-level three-dimensional environment.

FIG. 8C shows another environment having 5 tiers using 5 levels (note that the ground is not defined, otherwise there wold be 6 levels). Note that many of the objects in FIG. 8C, particularly the platform supports and ramps, are used at different levels, on top of different other objects, for different effects. Both the "theme" and diversity of each environment is easily defined simply by design and selection of block objects which become the building blocks for the specific Spot.

Figure 8D:
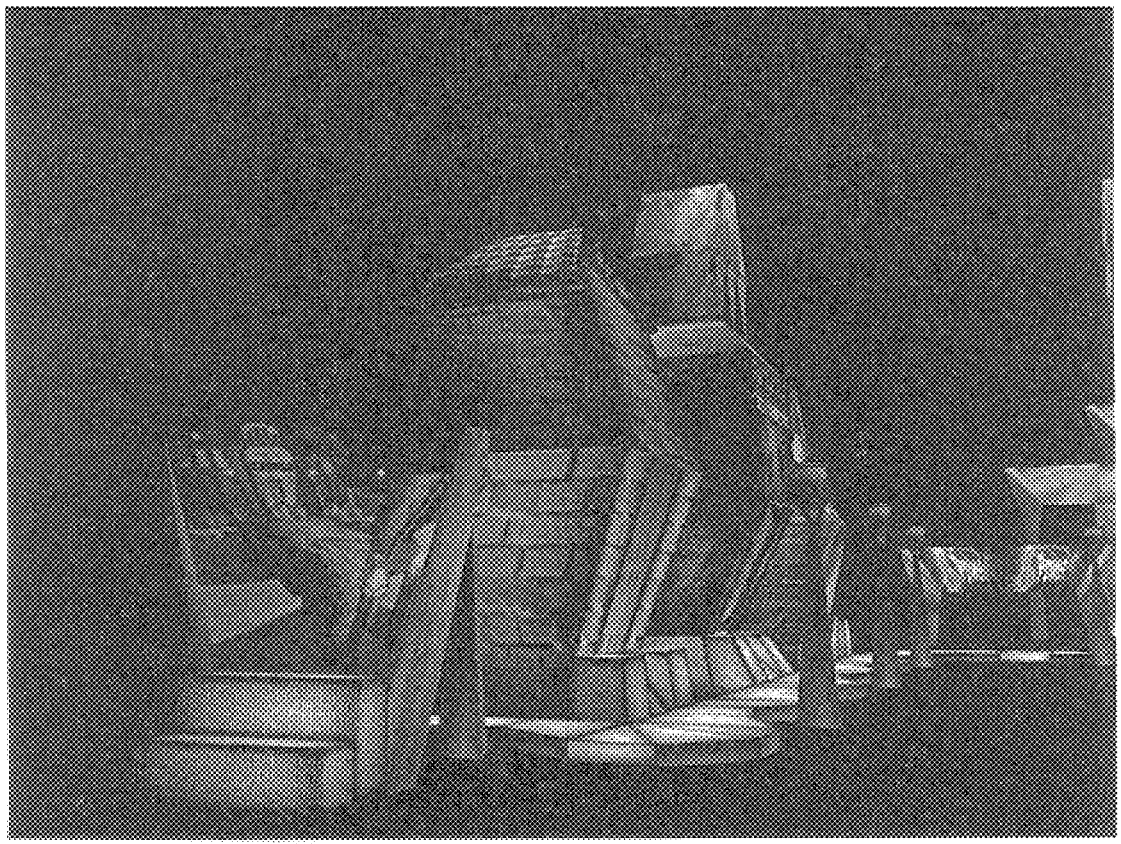
FIG. 8D is a fourth screenshot of a multi-level three-dimensional environment.

FIG. 8D illustrates a prospective feature of the present invention. In FIG. 8D a texture map has been made of a snapshot of a rendered view, such as the view of FIG. 8B, and mapped onto the object in the foreground of FIG. 8D. This achieves a doorway, or "portal," effect that simulates walking through an entrance into another room, world or environment. In the example of FIG. 8D, a user can walk up the steps in the immediate foreground and trigger a hyperlink just as the texture map of the 3-house village fills the display screen. The hyperlink links to the Spot used to define the 3-house village and places the user in a starting spot with the same perspective as shown in FIG. 8B. Thus, the user has the illustion of passing into another area of the environment. This can happen seamlessly on a fast network connection. Or the 3-house village Spot files can be pre-loaded onto the user's local storage.

Design tools can be provided to automate the implementation of a texture map portal. In other words, a designer can move around in a destination Spot until they are positioned at a desired entrance location. By selecting a button, the design tool generates the location in the Spot file and saves the texture map of the desired entrance location view. The URL of the destination Spot is associated with the texture map. Later, the designer finishes the design of a second Spot. The designer selects the destination view texture map and indicates where it is to be applied. The design tool automatically makes the object to which the texture map is being applied a hyperlink object to the URL of the destination Spot.

Figures 9A, 9B, 9C:
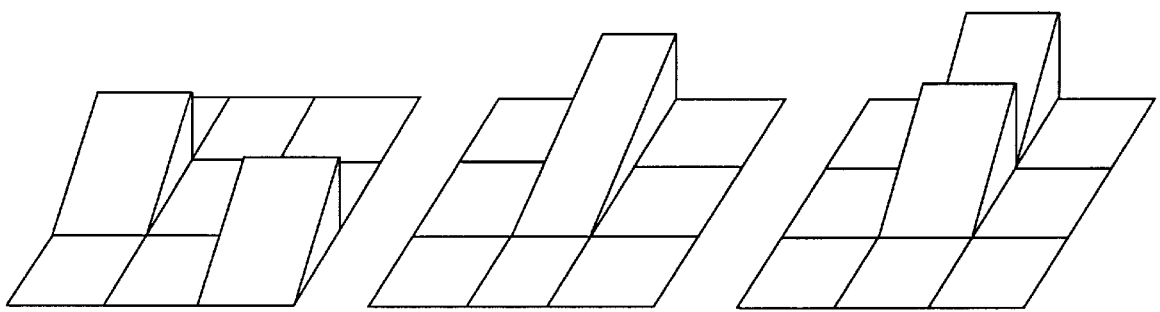
FIG. 9A is a first diagram to illustrate block melding.
FIG. 9B is a second diagram to illustrate block melding.
FIG. 9C is a third diagram to illustrate block melding.

Another prospective feature of the present invention would allow adjacent placing of two objects to result in a third, different object. For example, FIG. 9A shows two instances of a ramp object at two different grid locations in the three-dimensional world. The two objects are not adjacent and are shown distinct. FIG. 9B shows the resulting object when the two ramp objects are placed adjacent, and in-line. The resulting object is a ramp object with a shallower slope than the original objects. Such a melding of objects can be specified with tags or script in the .BLOCK, .SPOT or .STYLE files. FIG. 9C shows what the ramp object placement without melding would look like.

Multiple symbolic maps can be tiled together to create a larger map. This can be done simply by cutting and pasting in a text processor, by adjoining the text grids together. Where the maps reside at different URLs, coordinates, or other instructions, for joining the maps together are possible. The parser, or other process in the viewer, can download the Spot files and attach them according to the instructions so as to define a larger environment.

The use of the text character grid for the symbolic map representation provides many advantages in processing the maps to render a three-dimensional environment. Instead of dealing with objects at the polygon level, they may be dealt with at the object level, or grid or block level. Since each object is a block that occupies a grid location, as far as view processing is concerned, they are essentially the same unit. This greatly simplifies sorting, clipping, rendering and collision detection.

Many more features and variations on the specific embodiment discussed here are possible and within the scope of the invention. Thus, although the invention has been discussed with respect to a particular embodiment thereof, the scope of the invention is to be limited not by the embodiment, but solely by the appended claims.

What is claimed is:

1. A method for creating a three-dimensional view on a computer system, the computer system including a display coupled to a processor and database, the dataase including predefined three-dimensional objects, the computer system coupled to a network, the method comprising receiving a first symbolic map, wherein the symbolic map includes symbols and row and column adjacencies among the symbols;

parsing the first symbolic map for one or more symbols associated with a predefined three-dimensional object;

retrieving a predefined three-dimensional object associated with the symbol from the database, wherein two or more three-dimensional objects are each part of a common object; and rendering a display of a three-dimensional world using one or more of the predefined three-dimensional objects, wherein adjacencies in the first symbolic map are reproduced using the predfined three-dimensional objects in the display of the three-dimensional world.

2. The method of claim 1, wherein first and second three-dimensional objects are interlocking portions of a common object.

3. The method of claim 2, wherein the first three-dimensional object is a first portion of a building and wherein the second three-dimensional object is a second portion of a building.

4. The method of claim 3, wherein the first three-dimensional object includes a door and the second three-dimensional object includes a wall.

5. The method of claim 1, wherein the first symbolic map uses symbols that correspond to keyboard characters.

6. The method of claim 5, wherein the symbols are keyboard character codes.

7. The method of claim 6, wherein the display is rendered in a web browser.

8. A method for creating a three-dimensional view on a computer system, the computer system including a display coupled to a processor and database, the database including predefined three-dimensional objects, the computer system coupled to a network, the method comprising receiving a first symbolic map, wherein the symbolic map includes symbols and row and column adjacencies among the symbols;

parsing the first symbolic map for one or more symbols associated with a predefined three-dimensional object;

retrieving a predefined three-dimensional object associated with the symbol from the dasebase;

rendering a display of a three-dimensional world using one or more of the predefined three-dimensional objects, wherein adjacencies in the first symbolic map are reproduced using predefined three-dimensional objects in the display of the three-dimensional world; and defining a second symbolic map, wherein the second symbolic map includes symbols associated with three-dimensional objects to be displayed above three-dimensional objects associated with symbols in the first symbolic map.

9. The method of claim 8, wherein the first and second symbolic maps define first and second stories, respectively, in a building.

10. A computer-readable medium including instructions for creating a three-dimensional view on a computer system, the computer system including a display coupled to a processor and database, the database including predefined three-dimensional objects, the computer system coupled to a network, the computer-readable medium comprising one or more instructions for receiving a first symbolic map, wherein the symbolic map includes symbols and row and column adjacencies among the symbols;

one or more instructions for parsing the first symbolic map for one or more symbols associated with a predefined three-dimensional object;

one or more instructions for retrieving a predefined three-dimensional object associated with the symbol from the database, where two or more three-dimensional objects are each part of a common object; and one or more instructions for rendering a display of a three-dimensional world using one or more of the predefined three-dimensional objects, wherein adjacencies in the first symbols map are reproduced using the predefined three-dimensional objects in the display of three-dimensional world.

* * * * *